US011180626B2

(12) United States Patent
Seo et al.

(10) Patent No.: US 11,180,626 B2
(45) Date of Patent: Nov. 23, 2021

(54) METHOD OF PREPARING HIERARCHICALLY POROUS POLYMERS AND HIERARCHICALLY POROUS POLYMERS PREPARED THEREBY

(71) Applicant: KOREA ADVANCED INSTITUTE OF SCIENCE AND TECHNOLOGY, Daejeon (KR)

(72) Inventors: Myungeun Seo, Daejeon (KR); Jongmin Park, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 62 days.

(21) Appl. No.: 16/190,352

(22) Filed: Nov. 14, 2018

(65) Prior Publication Data
US 2019/0153190 A1 May 23, 2019

(30) Foreign Application Priority Data

Nov. 14, 2017 (KR) .................. 10-2017-0151641
Oct. 26, 2018 (KR) .................. 10-2018-0129226

(51) Int. Cl.
*C08J 9/28* (2006.01)
*C08F 293/00* (2006.01)
*C08B 37/00* (2006.01)
*C08B 37/02* (2006.01)

(52) U.S. Cl.
CPC ........... *C08J 9/283* (2013.01); *C08B 37/0003* (2013.01); *C08B 37/0021* (2013.01); *C08F 293/005* (2013.01); *C08F 2438/03* (2013.01); *C08J 2201/0464* (2013.01); *C08J 2205/042* (2013.01); *C08J 2325/08* (2013.01)

(58) Field of Classification Search
CPC .......... A61L 15/425; A61L 15/26; C08F 2/32; C08F 2/22; B01J 20/267; C04B 38/0064; C08J 9/283; C08J 2205/048
See application file for complete search history.

(56) References Cited

U.S. PATENT DOCUMENTS

2009/0093561 A1* 4/2009 Cordoneanu ....... C04B 38/0625
521/146

OTHER PUBLICATIONS

Kovacic et al "Responsive Poly(acrylic acid) and Poly(N-isopropylacrylamide) Monoliths by High Internal Phase Emulsion (HIPE) Templating", Macromol. Chem. Phys. 2011, 212, 2151-2158, published online Aug. 12, 2011.*
Macintyre et al. "Control of Porous Morphology in Suspension Polymerized Poly(divinylbenzene) Resins Using Oligomeric Porogens", Macromolecules 2004, 37, 7628-7636, Published on Web Sep. 3, 2004.*

Hainey, P., et al., "Synthesis and Ultrastructural Studies of Styrene-Divinylbenzene Polyhipe Polymers", "Macromolecules", 1991, pp. 117-121, vol. 24, Publisher: American Chemical Society.
Katiyar, A., et al., "Visualization of Size-Selective Protein Separations on Spherical Mesoporous Silicates", "Small", 2006, pp. 644-634, vol. 2, No. 5, Publisher: Wiley InterScience.
Kim, Y., et al., "Multiscale Porous Interconnected Nanocolander Network with Tunable Transport Properties", "Advanced Materials", 2014, pp. 7998-8003, vol. 26, Publisher: wileyonlinelibrary.com.
Moad, G., et al., "Accounts of Chemical Research", Sep. 2008, pp. 1133-1142, vol. 41, No. 9, Publisher American Chemical Society.
Olson, D., et al., "Templating Nanoporous Polymers with Ordered Block Copolymers", "Chem. Mater", 2008, pp. 869-890, vol. 20, Publisher: American Chemical Society.
Park, J., et al., "Effect of homopolymer in polymerization-induced microphase separation process", "Polymer", 2017, pp. 338-351, vol. 126, Publisher: journal homepage: www.elsevier.com/locate/polymer.
Saba, S., et al., "Hierarchically Porous Polymer Monoliths by Combining Controlled Macro-and Microphase Separation", "Journal of the American Chemical Society", 2015, pp. 8896-8899, vol. 137, Publisher: ACS Publications.
Sai, H., et al., "Hierarchical Porous Polymer Scaffolds from Block Copolymers", "Science", Aug. 2, 2013, pp. 530-534, vol. 341, Publisher: AAAS.
Seo, M., et al., "Reticulated Nanoporous Polymers by Controlled Polymerization-Induced Microphase Separation", "Science", Jun. 15, 2012, pp. 1422-1425, vol. 336, Publisher: AAAS.
Sun, Z., et al., "Hierarchically Ordered Macro-/Mesoporous Silica Monolith: Tuning Macropore Entrance Size for Size-Selective Adsorption of Proteins", "Chemistry of Materials", 2011, pp. 2176-2184, vol. 28, Publisher American Chemical Society.
Tebboth, M., et al., "Liquid-Liquid Extraction within Emulsion Templated Macroporous Polymers", "Industrial & Engineering Chemistry Research", 2015, pp. 7284-7291, vol. 54, Publisher: American Chemical Society.

(Continued)

*Primary Examiner* — Gregory Listvoyb
(74) *Attorney, Agent, or Firm* — Hultquist, PLLC; Steven J. Hultquist

(57) ABSTRACT

The present invention relates to a method of preparing a hierarchically porous polymer and a hierarchically porous polymer prepared thereby. The method comprises the steps of: (a) polymerizing an external oil phase of a high internal phase emulsion (HIPE) consisting aqueous droplets to produce a cross-linked block copolymer; (b) obtaining a macroporous polymer with interconnected macropores by removing the aqueous droplets; and (c) treating the obtained porous polymer with a base, thereby obtaining a hierarchically porous polymer having three-dimensional mesopores formed in the macroporous walls. According to the method, the macropore size and mesopore size of the hierarchically porous polymer can all be controlled. The hierarchically porous polymer prepared by the method can easily separate polymers having different sizes, and thus is highly useful in the polymer separation field.

11 Claims, 22 Drawing Sheets
(20 of 22 Drawing Sheet(s) Filed in Color)

(56) References Cited

OTHER PUBLICATIONS

Ungureanu, S., et al., "One=pot Syntheses of the first Series of Emulsion Based Hierarchical Hybrid Organic-Inorganic Open-Cell Monoliths Possessing Tunable Functionality (Organo-Si(HIPE) Series)", "Chem. Mater.", 2007, pp. 5786-5796, vol. 19, Publisher: American Chemical Society.

Williams, J., "Toroidal Microstructures from Water-in-Oil Emulsionss", "Langmuir", 1988, pp. 44-49, vol. 4, Publisher: American Chemical Society.

Yoo, S., et al., "Hierarchical multiscale hyperporous block copolymer membranes via tunable dual-phase separation", "Nanomaterials", Jul. 24, 2015, p. 1:e1500101, Publisher: advances.sciencemag.org.

Yu, H., et al., "Asymmetric block copolymer membranes with ultrahigh porosity and hierarchical pore structure by plain solvent evaporation", "Chem. Commun.", 2016, pp. 12064-12067, vol. 52, Publisher: The Royal Society of Chemistry.

Hu, W., et al., "Hierarchically Porous Carbon Derived From PolyHIPE for Supercapacitor and Deionization Applications", "Langmuir", 2017, pp. 13364-13375, vol. 33.

Seo, M., et al., "Hierarchically Porous Polymers from Hyper-Cross-Linked Block Polymer Precursors", "Journal of the American Chemical Society", 2015, pp. 600-603, vol. 137.

\* cited by examiner

METHOD OF PREPARING HIERARCHICALLY POROUS POLYMERS AND HIERARCHICALLY POROUS POLYMERS PREPARED THEREBY

CROSS-REFERENCE TO RELATED APPLICATIONS

The priority under 35 USC § 119 of Korean Patent Application No. 10-2017-0151641 filed Nov. 14, 2017 and the priority under 35 USC § 119 Korean Patent Application No. 10-2018-0129226 filed Oct. 26, 2018 are hereby claimed. The disclosures of such Korean priority patent applications are hereby incorporated herein by reference in their respective entireties, for all purposes.

TECHNICAL FIELD

The present invention relates to a method of preparing a hierarchically porous polymer and a hierarchically porous polymer prepared thereby, and more particularly to a method of preparing a hierarchically porous polymer containing three-dimensionally continuous mesopores formed in macropore walls by inducing microphase separation in the external phase of a high internal phase emulsion (HIPE) by polymerization and dissolving a pore-forming material, and a hierarchically porous polymer prepared thereby.

BACKGROUND ART

Porous polymers are polymer materials containing pores therein. According to IUPAC, porous materials can be classified by pore size into macropore (>50 nm), mesopore (2 to 50 nm), and micropore (<2 nm).

Hierarchically porous polymers, which contain multiscale pores ranging from meso- (2-50 nm) to macro (>50 nm) sizes, are promising materials for use in separation, templating, and energy-related applications (Sai, H. et al., *Science* 341, 530-534 (2013); Kim, Y. H. et al., *Adv. Mater.* 26, 7998-8003 (2014); You, S. et al., *Sci. Adv.* 1, e1500101 (2015); Yu, H. et al., *Chem. Commun.* 52, 12064-12067 (2016); Saba, S. A. et al., *J. Am. Chem. Soc.* 137, 8896-8899 (2015); Park, J. et al., *Polymer* 126, 338-351 (2017)). To analyze the potential of the hierarchical pore structure, and produce high flux and high specific surface area, a simple and scalable methodology is needed to achieve three-dimensionally (3D) continuous mesopores within the highly porous and interconnected macropore structure. Orthogonal control over different pore length scales is particularly important for adjusting pore characteristics and for differentiating substrates by size. These features allow size-selective transport and reactions as only the substrate smaller than the mesopore will be able to diffuse into the mesoporous space and access the active surface (Katiyar, A. et al., *Small* 2, 644-648 (2006); Sun, Z. et al., *Chem. Mater.* 23, 2176-2184 (2011)). Finally, the matrix polymer should remain mechanically robust without being affected by such pore structure.

Block copolymer self-assembly is an intriguing strategy for generating mesoporous polymers with well-defined pore structures, because it allows precise control of pore size, and tailored surface functionality (Olson, D. A. et al., *Chem. Mater.* 20, 869-890 (2008)). By covalently joining a chemically-etchable polymer with a matrix polymer, the resulting block polymer forms versatile nanostructures via microphase separation and becomes mesoporous after removal of the sacrificial component. Several approaches have been reported which integrate macropores in block polymer-based mesopore structures (Sai, H. et al., *Science* 341, 530-534 (2013); Kim, Y. H. et al., *Adv. Mater.* 26, 7998-8003 (2014); You, S. et al., *Sci. Adv.* 1, e1500101 (2015); Yu, H. et al., *Chem. Commun.* 52, 12064-12067 (2016); Saba, S. A. et al., *J. Am. Chem. Soc.* 137, 8896-8899 (2015); Park, J. et al., *Polymer* 126, 338-351 (2017)). However, issues such as insufficient porosity, lack of pore connectivity, narrow synthetic window and laborious synthesis have limited their implementation in practice.

In hierarchically porous polymers, large-sized pores function as a channel through which a material can diffuse quickly, and small-sized pores provide a large surface area onto which the diffused material can adsorb. In particular, in the case of hierarchically porous polymers containing macropores and mesopores, a material having a size of several nanometers to tens of nanometers can pass quickly pass the macropores and enter the mesopores, and thus these hierarchically porous polymers are expected to be suitable for use in solid phase separation of polymer materials, such as proteins, or as supports for catalytic reactions. However, it is not easy to make actually usable hierarchically porous polymers. That is, it is meaningful that the macropores and the mesopores are fully connected to each other while having a three-dimensionally structure. In addition, the volume of the macropores should be large enough to achieve a significant flow rate. However, as the volume of the pores increases, the volume of the polymer corresponding to the framework relatively decreases. Thus, unless the mechanical rigidity of the hierarchically porous polymer is sufficient, the pores will collapse. Finally, in order to separate materials by their size, the size of each type of pores should be capable of being controlled. However, methods capable of controlling two types of pores having different sizes are rare (U.S. Patent Publication No. 2009-0173694 A1; U.S. Pat. No. 9,527,041 B2; Williams, J. M. et al., *Langmuir* 4, 44-49 (1988); Seo, M. et al., *Science* 336, 1422-1425 (2012); Sai, H. et al., *Science* 341, 530-534 (2013)).

*Langmuir* 4, 44-49 (1988) describes preparing a porous polymer having interconnected macropores by forming a high internal phase emulsion having water as an internal phase and a mixture of styrene and divinylbenzene as an external phase and subjecting the mixture to radical polymerization, followed by removal of the water.

U.S. Patent Publication No. 2009-0173694 and U.S. Pat. No. 9,527,041B2 disclose a method of producing an asymmetric porous polymer membrane by dissolving one or more block copolymers having controlled molecular weight and composition ratio in a solvent, casting the solution onto a substrate, and then brining the resulting film into contact with a non-solvent while controlling evaporation of the solvent, thereby forming several nanometer to several tens nanometer-sized mesopores on the surface and making several nanometer-sized macropores in the lower portion.

A literature, *Science* 336, 1442-1425 (2012) is the first report on the polymerization-induced microphase separation process, and proposes the formation of a mesoporous polymer using polylactide (PLA) capable of being easily etched under basic conditions.

A literature, *Science* 341, 530-534 (2013) discloses a method of preparing a hierarchically porous polymer by mixing a block copolymer with a homopolymer and a solvent and inducing microphase separation in one phase while inducing macroscopic phase separation through a spinodal decomposition process.

However, the above-described methods have difficulties in increasing the pore volume and controlling the macropore size.

Accordingly, the present inventors have made extensive efforts to solve the above-described problems, and as a result, have prepared a hierarchically porous polyHIPE (hereinafter referred to as "h-polyHIPE") having three-dimensionally continuous mesopores with a size of 10 nm formed in macropore walls having interconnected macropores and with a size of 1 μm by inducing microphase separation in the external phase of a high internal phase emulsion (HIPE) by polymerization and removing pore-forming materials, and have found that the prepared hierarchically porous polyHIPE can be used to selectively separate polymers having different sizes, thereby completing the present invention.

DISCLOSURE OF INVENTION

It is an object of the present invention to provide a method of preparing a hierarchically porous polymer, which can control the sizes of mesopores and macropores in a hierarchically porous polymer having a porosity of more than 90%, and a hierarchically porous polymer prepared by the method.

Another object of the present invention is to provide a method for separating polymers with different molecular weights by use of the above-described hierarchically porous polymer.

The above objects of the present invention can be achieved by the present invention as specified below.

To achieve the above object, the present invention provides a method of preparing a hierarchically porous polymer, comprising: (a) converting an external phase of a high internal phase emulsion (HIPE) consisting aqueous droplets to cross-linked block copolymer by polymerization; (b) obtaining a macroporous polymer in which macropore are connected by removing the aqueous droplets; and (c) obtaining a hierarchically porous polymer having three-dimensional mesopores formed in the macropore walls by treating the obtained macroporous polymer with a base.

The present invention also provides a hierarchically porous polymer prepared by the above-described method.

The present invention also provides a method for separating a polymer, comprising using the above-described hierarchically porous polymer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

BEST MODE FOR CARRYING OUT THE INVENTION

Figure 1:
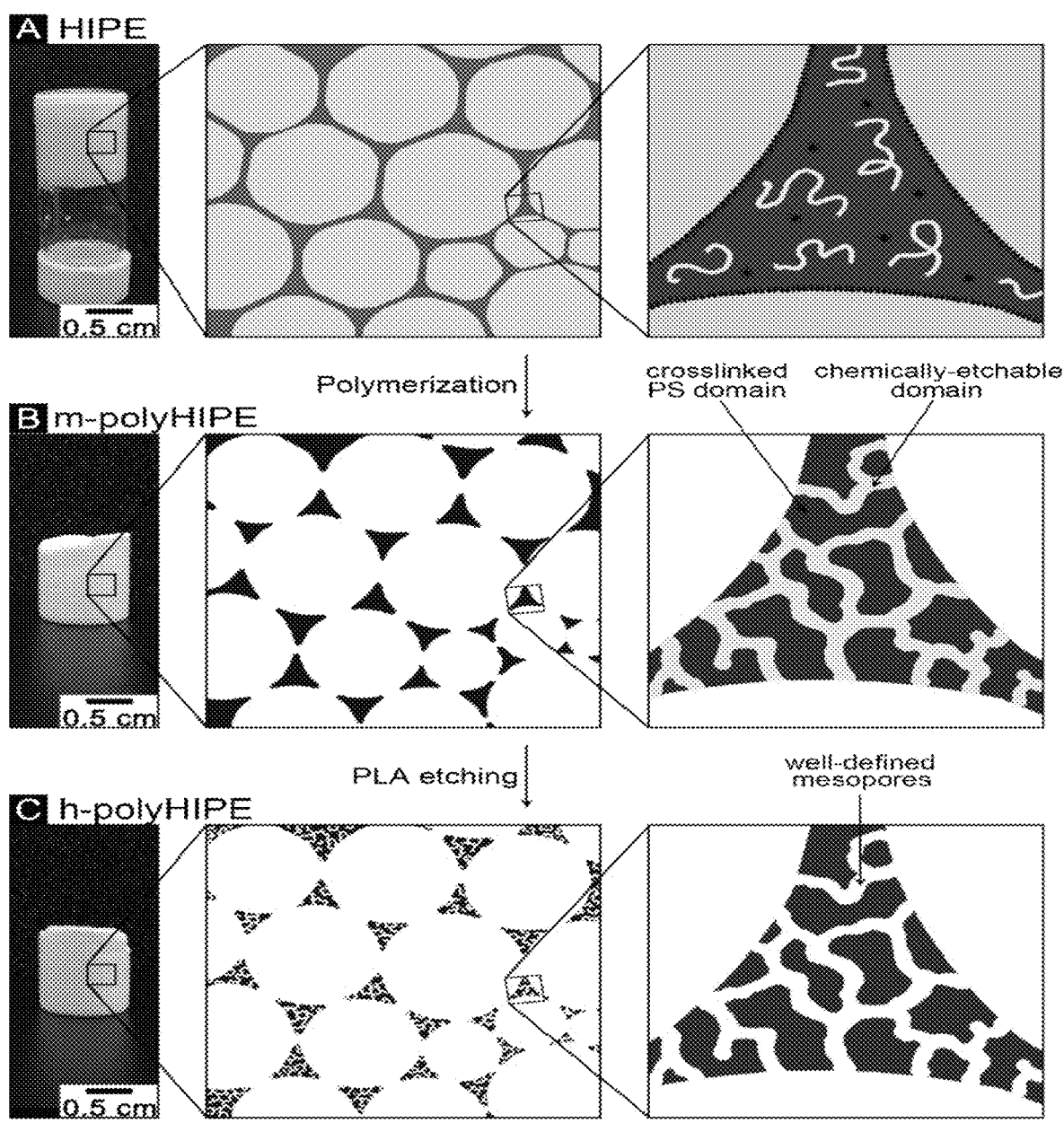
FIG. 1 is a view schematically showing a process for preparing h-polyHIPE according to the present invention.

Unless defined otherwise, all the technical and scientific terms used herein have the same meaning as those generally understood by one of ordinary skill in the art to which the invention pertains. Generally, the nomenclature used herein and the experiment methods, which will be described below, are those well-known and commonly employed in the art.

In the present invention, it has been found that a hierarchically porous polymer (h-polyHIPE) having three-dimensionally continuous mesopores with a size of 10 nm formed in macropore walls having interconnected macropores and with a size of 1 μm. By inducing microphase separation in the external phase of a HIPE by polymerization and removing pore-forming materials, an ultra-highly porous polymer having a total pore volume of 90% or higher can be prepared by simultaneously controlling the sizes and fractions of two types of pores having different sizes. This polymer can be used for selective separation of materials having different sizes.

Therefore, in one aspect, the present invention is directed to a method of preparing a hierarchically porous polymer, comprising: (a) converting an external phase of a high internal phase emulsion consisting aqueous droplets to cross-linked block copolymer by polymerization; (b) obtaining a macroporous polymer in which macropore are connected by removing the aqueous droplets; and (c) obtaining a hierarchically porous polymer having three-dimensional mesopores formed in the macropore walls by treating the obtained macroporous polymer with a base.

One preferred embodiment of the method of preparing the hierarchically porous polymer according to the present invention is as follows.

A homogeneous solution is prepared, which comprises: a polylactide macro-chain transfer agent (PLA-CTA) comprising polylactide, a polymer which is easily decomposed under basic conditions; styrene; divinylbenzene; and Span 80. The solution is vigorously mixed with an aqueous solution containing calcium chloride ($CaCl_2$)) and potassium persulfate ($K_2S_2O_8$), thereby preparing a high internal phase emulsion. Span 80, a surfactant, functions to stabilize the interface between an internal phase composed of micrometer-sized aqueous droplets and an external phase composed of an organic polymerization mixture. When the solution is heated at 70° C., potassium persulfate produces a radical at the water/oil interface, thereby copolymerizing styrene with divinylbenzene. At this time, PLA-CTA interacts with the formed radical according to the reversible addition-fragmentation chain transfer (RAFT) polymerization mechanism, thereby forming a block copolymer composed of polylactide and poly(styrene-divinylbenzene). Since divinylbenzene has two double bonds, cross-linking reactions occur at the same time. Thus the whole external phase is converted into a densely cross-linked block copolymer. In this process, microphase separation between polylactide and poly(styrene-divinylbenzene) occurs through the polymerization-induced microphase separation, thus forming a disordered bicontinuous structure. In addition, since the density of the external phase increases while the polymerization occurs, pore throats are formed in the external phase to maintain the total volume, and the aqueous droplets are connected to one another. Thus, when the aqueous droplets are removed, a macroporous polymer having the external phase as pore walls and containing fully interconnected macropores is obtained. When the polylactide is removed by treating the macroporous polymer with a base, three-dimensionally continuous mesopores having a size of about 10 nm are formed in the pore walls, thereby obtaining a hierarchically porous polymer.

In the present invention, polymerization in the external phase can be produced by achieved by heating or photopolymerization. The high internal phase emulsion can be prepared by mixing an aqueous solution and an organic polymerization mixture comprising a macro-chain transfer agent containing a polymer, a monomer, a cross-linking agent, and a surfactant.

Depending on the ratio between the organic polymerization mixture and the aqueous solution, the composition of the aqueous solution, mixing conditions or the amount of the surfactant, the volume of the macropores may be adjusted. Specifically, the volume ratio between the organic polymerization mixture and the aqueous solution may be 1:2.85 to 9. In addition, the volume of the macropores may be adjusted depending on the proportion of water in the composition of the aqueous solution.

The aqueous solution may be at least one selected from the group consisting of aqueous solutions of calcium chloride ($CaCl_2$), potassium persulfate ($K_2S_2O_8$), sodium chloride (NaCl), potassium sulfate ($K_2SO_4$), phosphate buffered saline (PBS), and ascorbic acid, and calcium chloride ($CaCl_2$)) or sodium chloride (NaCl) may preferably be used.

The high internal phase emulsion may be prepared by mixing at a stirring rate of 300-3000 rpm, preferably 1500-3000 rpm at room temperature, preferably at a temperature of 20-40° C. If the temperature is high, the emulsion will be prone to collapse, and if the temperature is low, the highly viscous organic polymerization mixture will be problematic to form the high internal phase emulsion. If the stirring speed is slower than 300 rpm, a problem will arise in that aqueous droplets are not easily dispersed in the organic polymerization mixture which is the external phase. The surfactant may have a hydrophilic-lipophilic balance (HLB) value of 3.5-4.5, preferably an HLB value of about 4.1. The surfactant may be contained in an amount of 8 to 17 parts by weight, based on 100 parts by weight of the external phase (organic polymerization mixture) (reference material).

The volume and size of the mesopores may be adjusted depending on the amount or molecular weight of the polymer. The polymer may be selected from the group consisting of polylactic acid (PLA), polyethylene oxide (PEO), polydimethylsiloxane (PDMS), and polyisoprene (PI), and may be contained in an amount of 10 to 30 parts by weight, based on 100 parts by weight of the external phase (organic polymerization mixture. In addition, as a preferred example of the macro-chain transfer agent containing a polymer, PLA-CTA (polylactide-macro chain transfer agent), PLA-b-PPEGA-CTA (polylactide-b-poly(ethylene glycol) acrylate-macro chain transfer agent), PT-CTA (polyisoprene-macro chain transfer agent) and PDMS-CTA (poly(dimethylsiloxane)-macro chain transfer agent) may be used and preferably PLA-CTA or PLA-b-PPEGA may be used.

In the present invention, the monomer may be at least one selected from the group consisting of styrene, 2-ethylhexyl acrylate, 2-ethylhexyl methacrylate, butyl acrylate, isobonyl acrylate, 4-tert-butylstyrene, 4-methyl styrene, 4-isopropyl styrene, 4-cyclohexyl styrene, 4-trim ethyl silyl styrene, vinylbenzyl chloride, and p-ethyl styrene.

In the present invention, the cross-linking agent may be at least one selected from the group consisting of divinylbenzene, 2,4,6,8-tetramethyl-2,4,6,8-tetravinylcyclotetrasiloxane, 1,3,5-trimethyl-1,3,5-trivinyl-cyclotrisiloxane, diethyl ene glycol divinyl ether, diethylene glycol diacrylate, ethylene glycol dimethacrylate, 1,3-diethenyl-1,1,3,3-tetramethyl-disiloxane, and methylene bisacrylamide. As the cross-linking agent, a vinylcyclotetrasiloxane-based cross-linking agent may affect cross-linking density or phase separation since it does not control polymerization sufficiently and progresses polymerization slowly under the conditions of the present invention. In addition, an ethylene glycol acrylate/methacrylate-based cross-linking agent may be decomposed under the base treatment conditions.

In the present invention, in order to effectively adsorb a desired substance from a solution rapidly moving inside the synthesized hierarchically porous polymer, a structure must be implemented which can attain high specific surface area with high flux by introducing interconnected mesopores at nanometer (nm) scale into a highly porous macropore framework. In the present invention, a hierarchically porous polymer is produced in which three-dimensionally continuous mesopores are formed in macropore walls having interconnected macropores by inducing microphase separation in a high internal phase emulsion having droplets dispersed in a continuous oil phase and dissolving a pore-forming material.

The present invention is directed to a method for synthesis of a hierarchically porous polymer comprising: micrometer-sized macropores induced from a high internal phase emulsion; and mesopores formed through polymerization-induced microphase separation which is a kind of block copolymer phase separation.

In the present invention, it can be demonstrated that hierarchically porous polymers with porosity >90% can be readily prepared with control over both meso- and macropore size, by polymerizing an emulsified polymerization mixture.

In the present invention, high internal phase emulsions can be used which are composed of a thin and continuous "external" oil phase and a dispersed "internal" aqueous phase that occupy more than 74% of the volume, to template an interconnected highly porous macropore structure. By using a polymerization mixture containing a monomer and a cross-linking agent as the HIPE oil phase, a robust macroporous framework can be attained by radical copolymerization. Then, removal of the water can effectively transforms the space occupied by the aqueous phase into interconnected and micrometer-sized spherical pores (Williams, J. M. *Langmuir* 4, 44-49 (1988)). The resulting polymerized HIPE (polyHIPE) is a highly porous material with low density, and is useful for separation (Tebboth, M. et al., *Ind. Eng. Chem. Res.* 54, 7284-7291 (2015)).

The cross-linking copolymerization is the key step to achieving the template structure in the polyHIPE technology. The polymerization-induced microphase separation (hereinafter, referred to as PIMS) process is utilized in the polymerization of the oil phase to produce a cross-linked block polymer as the macroporous framework, which also serves as the precursor of the mesoporous thermosetting resin. The PIMS process differs from other block copolymer self-assembly methods using pre-synthesized polymers. It starts with a homogeneous polymerization mixture containing a vinyl monomer, a crosslinker, and a macro-chain transfer agent bound to the end of a sacrificial polymer (Seo, M. et al. *Science* 336, 1422-1425 (2012); Saba, S. A. et al., *J. Am. Chem. Soc.* 137, 8896-8899 (2015); Park, J. et al., *Polymer* 126, 338-351 (2017). As reversible addition-fragmentation chain transfer (RAFT) (Moad, G. et al., *Acc. Chem. Res.* 41, 1133-1142 (2008)) copolymerization grows a polymer block from the end of the sacrificial polymer, the segregation strength between two blocks increases to cause microphase separation and spontaneously produce a disordered bicontinuous morphology, which is arrested by in situ cross-linking. In essence, the whole polymerization mixture is transformed into a cross-linked, isotropic, and bicontinuous block polymer precursor by polymerization. Removal of the sacrificial polymer from the precursor generates 3D continuous mesopores, firmly supported by the cross-linked matrix, yielding a reticulated mesoporous polymer (RMP).

The PIMS approach used in the present invention can satisfy requirements for both mesopore connectivity and mechanical stability in the nanostructuring of the polyHIPE framework. This can circumvent the challenges typically expected with conventional block polymer self-assembling methods, such as handling viscous solutions, maneuvering and aligning the microphase-separated structures, and post-cross-linking reactions. Unlike other ill-defined pore-forming methods within the polyHIPE framework (Hainey, P. et al., *Macromolecules* 24, 117-121 (1991)), the PIMS approach generates well-defined mesopores with narrow pore size distribution comparable to inorganic counterparts (Ungureanu, S. et al., *Chem. Mater.* 19, 5786-5796 (2007)), and allows straightforward size control, by varying the molar mass of the sacrificial polymer (Seo, M. et al. *Science* 336, 1422-1425 (2012)) and also adding the selective additive (Park, J. et al., *Polymer* 126, 338-351 (2017)).

Accordingly, in the present invention, the PIMS polymerization mixture is used as the oil phase in the HIPE to prepare hierarchically porous polyHIPE (h-polyHIPE). The overall process is schematically depicted in FIG. 1. A soft solid HIPE in which micrometer-sized aqueous droplets are dispersed in the polymerization mixture is formed by vigorously mixing an organic polymerization mixture consisting of styrene (S), divinylbenzene (DVB), polylactide macro-chain transfer agent (PLA-CTA), and Span 80, with an aqueous solution containing potassium persulfate (KPS) and $CaCl_2$ (part A of FIG. 1). Here, Span 80 with a hydrophilic-lipophilic balance (HLB) value of about 4.1 is used as an emulsifier to stabilize the water-in-oil HIPE. Polymerization transforms the oil phase into a cross-linked block polymer consisting of bicontinuous PLA and P(S-co-DVB) domains, following the PIMS mechanism. Removal of the aqueous phase results in microphase-separated polyHIPE (m-polyHIPE), containing a highly porous and fully interconnected macropore structure (part B of FIG. 1). Openings between adjacent aqueous droplets are spontaneously generated during polymerization due to increased density. Finally, a basic treatment easily removes the PLA from the m-polyHIPE to generate mesopores and complete the h-polyHIPE (part C of FIG. 1).

Figure 3:
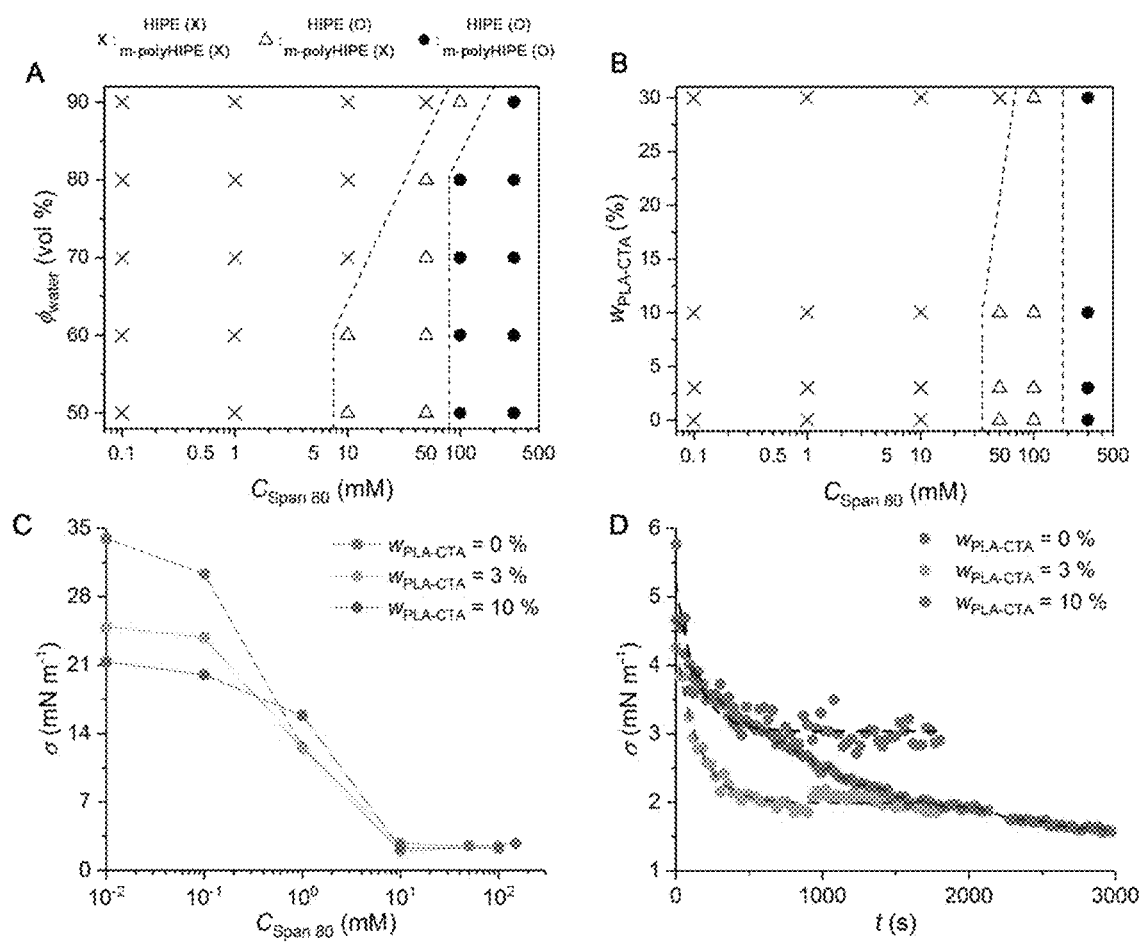
FIG. 3 is a view showing the role of Span 80 on the formation and stability of HIPE according to the present invention.

In the present invention, a role of Span 80 as a surfactant on formation and stability of HIPE is shown in FIG. 3. FIG. 3 in graphs A and B shows phase diagrams for the stable HIPE and m-polyHIPE formation as a function of Span 80 concentration ($C_{span\ 80}$)(A) vs. the aqueous phase volume fraction ($\phi_{water}$) at 30 wt % of PLA-CTA in the polymerization mixture ($w_{PLA-CTA}$=30%)(B) vs. $w_{PLA-CTA}$ at $\phi_{water}$=90%. FIG. 3 in graph C and graph D shows static and dynamic interfacial tension ($\sigma$) between the aqueous phase and the polymerization mixture at different $w_{PLA-CTA}$s((C): $\sigma$ as a function of $C_{span\ 80}$; and (D): $\sigma$ with $C_{Span\ 80}$=10 mM). Dotted lines represent exponential fits ($\propto e^{-t/\tau}$) with $\tau$ as the characteristic time.

In another aspect, the present invention is directed to a hierarchically porous polymer prepared by the above-described method.

The hierarchically porous polymer according to the present invention is prepared in which three-dimensionally continuous mesopores are formed in the walls of interconnected macropores, and the macropores may have a volume fraction of more than 90%. The macropores may have a size of 50 nm to 10 µm, preferably 300 nm to 5 µm, more preferably 500 nm to 3 µm, and the mesopores may have a size of 2-50 nm, preferably 4-30 nm, more preferably 5-20 nm.

The characteristics of the hierarchically porous polymer according to the present invention are as follows.

First, the volume of the macropores may be controlled by adjusting the ratio between the aqueous solution and organic polymerization mixture used. Furthermore, when the composition of the aqueous solution, mixing conditions, the amount of the surfactant, etc., are adjusted, the size of the macropores may also be controlled.

Second, the volume and size of the mesopores may also be precisely controlled by adjusting the amount, molecular weight, etc. of polylactide contained in the organic polymerization mixture. This control is performed independently of the macropore control method, and thus it is possible to simultaneously control two types of pore structures.

Third, since two types of pores are all three-dimensionally continuous and the volume fraction of the macropores can be increased up to 90%, the hierarchically porous polymer is very effective for material elution. In addition, since the strongly cross-linked framework supports the pore structure, the polymer can withstand high flow rates. In fact, after the polymer is inserted into a syringe and an aqueous solution is placed thereon, the aqueous solution can be eluted at high rate (~20 mL/min) by pressing a plunger.

Fourth, due to such structural characteristics, the hierarchically porous polymer of the present invention may be used as a new material for size exclusive separation. Namely, during the passage of a solution through the polymer, a material that can enter the mesopores diffuses rapidly and is trapped in the mesopores, and a material that cannot enter the mesopores due to its size larger than the mesopores passes quickly through the macropores. This is possible only when all the structural characteristics are satisfied, and this is a new property that can never be obtained if even one of these characteristics is not satisfied.

Figure 2:
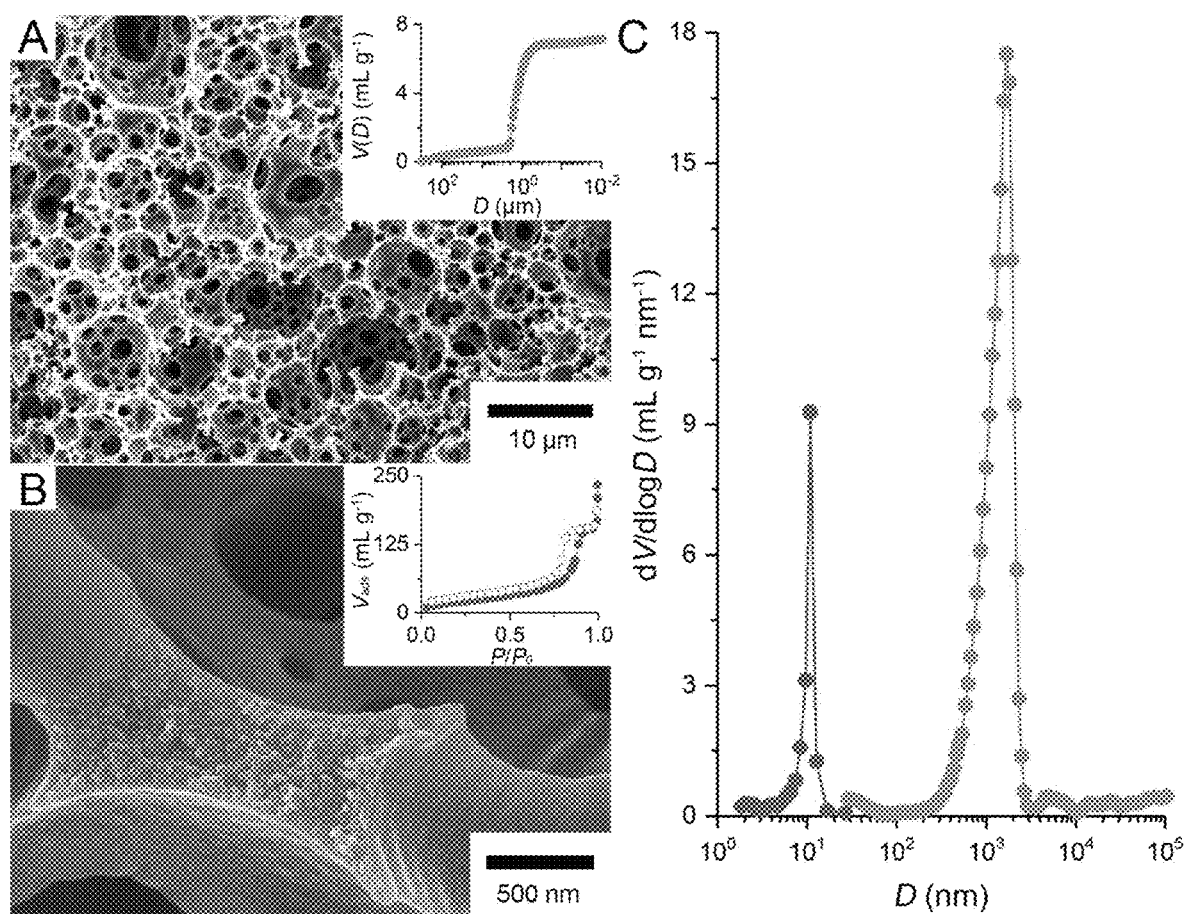
FIG. 2 is a view showing the morphology and pore characteristics of h-polyHIPE according to the present invention.

FIG. 2 shows the morphology and pore characteristics of h-polyHIPE according to the present invention. FIG. 2 in parts (A) and (B) illustrates the interconnected macropore structure templated by the HIPE, and the reticulated mesoporous structure derived from the PIMS process (A: low magnification, and B: high magnification). The inset in part (A) is a plot of the cumulative volume (V) of mercury as a function of pore diameter (D). The inset in part (B) is a nitrogen sorption isotherm indicating the adsorbed amount ($V_{ads}$) of nitrogen as a function of relative pressure ($P/P_0$). FIG. 2 in part (C) illustrates an overlay of pore size distributions obtained by mercury intrusion porosimetry and BJH analysis of the desorption branch in the nitrogen sorption isotherm.

In still another aspect, the present invention is directed to a method for separating a polymer, comprising using the above-described hierarchically porous polymer.

Figure 4:
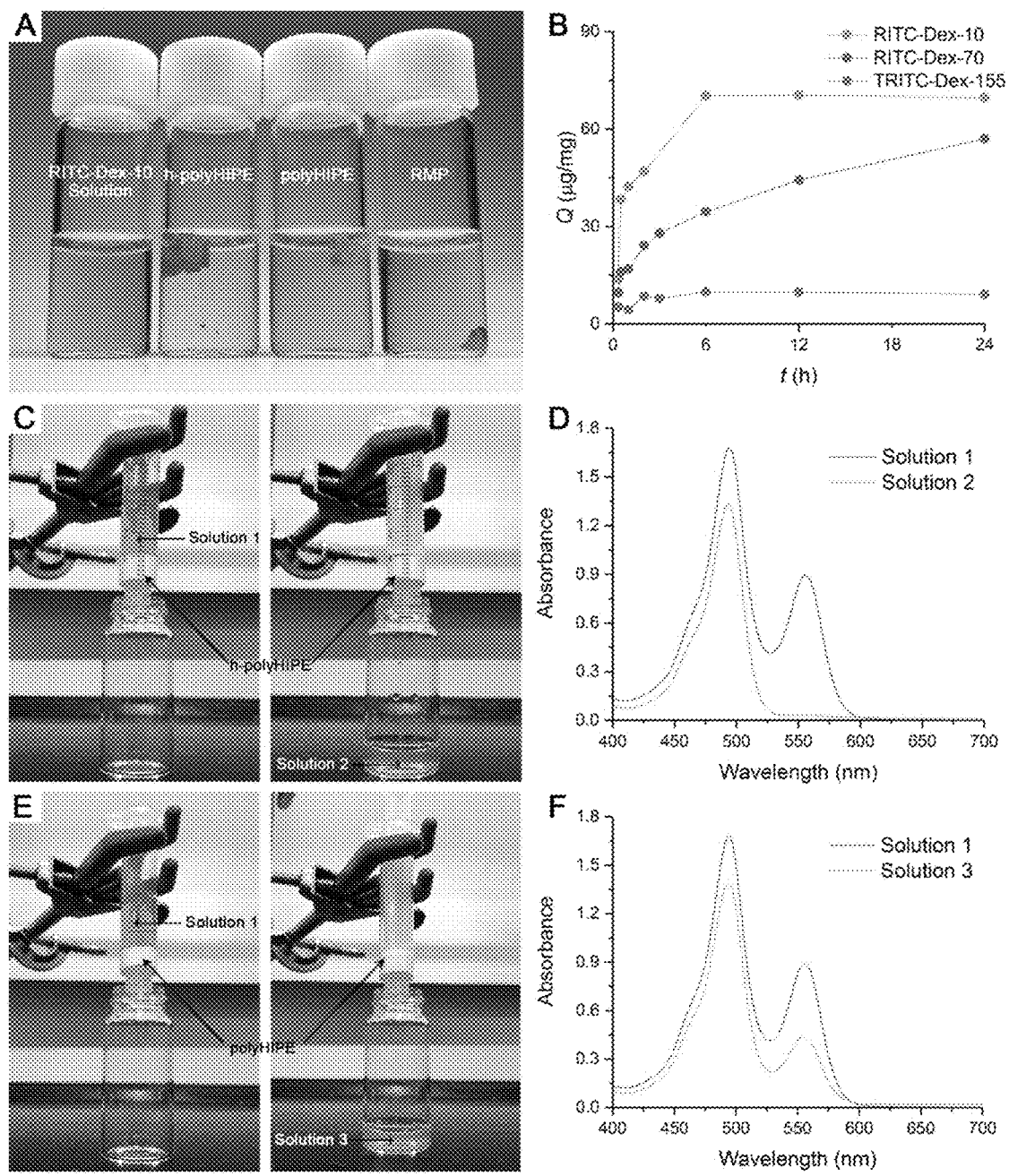
FIG. 4 depicts photographs and graphs showing size-selective adsorption of h-polyHIPE according to the present invention.

FIG. 4 shows size-selective adsorption of h-polyHIPE according to the present invention. FIG. 4 in part (A) shows a photo of an aqueous solution of RITC-Dex-10, h-polyHIPE, HIPE and RMP after immersing in the RITC-Dex-10 solution for 24 hours. FIG. 4 in graph (B) is an adsorption capacity (Q) of h-polyHIPE for dye-tagged dextran with different molar masses. FIG. 4 in parts (C) and (E) shows visual images of elution of an aqueous solution (solution 1) containing RITC-Dex-10 and FITC-Dex-500 through h-polyHIPE and polyHIPE inserted in a 5-mL disposable syringe. FIG. 4 in graphs (D) and (F) shows absorption spectra before (solution 1) and after (solutions 2 and 3) elution through each monolith.

Figure 5:
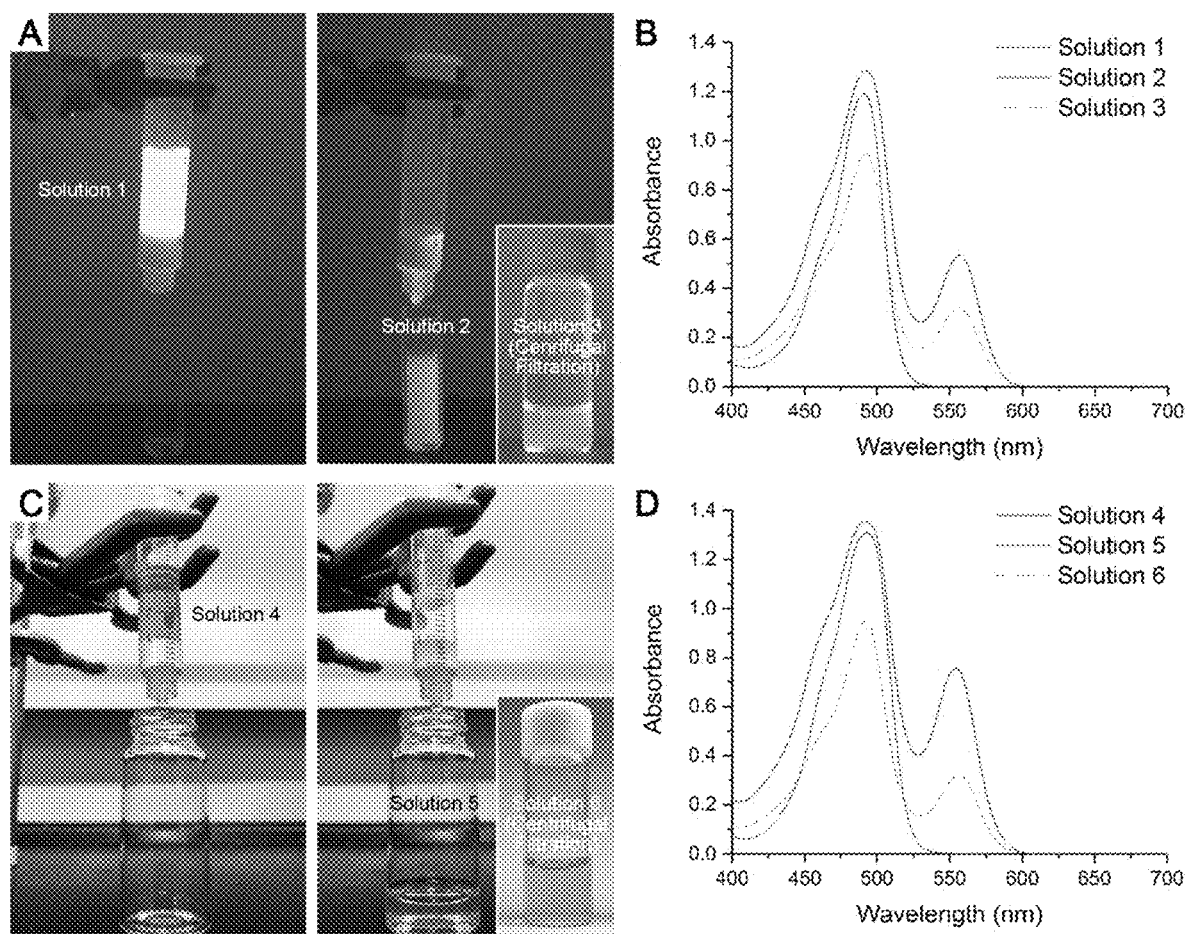
FIG. 5 is a view showing control over molar mass cutoff of h-polyHIPE according to the present invention.

FIG. 5 shows control over molar mass cutoff of h-polyHIPE. FIG. 5 in parts (A) and (B) shows visual images under UV ramp and absorbance spectra of elution of an aqueous solution (solution 1) containing RITC-Dex-70 and FITC-Dex-150 through h-polyHIPE synthesized with PLA-CTA-20. FIG. 5 in parts (C) and 5(D) shows visual images and absorption spectra of elution of an aqueous solution (solution 4) containing RITC-Dex-10 and FITC-Dex-70 through h-polyHIPE synthesized with PLA-CTA-7.

Where a solution contains materials having different sizes, size-selective separation of the materials is generally performed by making pores having a predetermined size and filtering the solution through a membrane containing the pores, thereby passing only the material smaller than the pores while leaving the material larger than the pores. However, on the contrary, the present invention discloses a method in which during the passage of a solution through the hierarchically porous polymer, only a material capable of entering mesopores is selectively adsorbed and a material having a larger size than the mesopores passes quickly through macropores, thereby separating the materials from each other. Depending on the size of a material to be separated, the size of the mesopores and the amount of the hierarchically porous polymer may be adjusted, thereby precisely controlling how much material having a specific size is adsorbed. This method differs from conventional filtration and is similar to size exclusion chromatography (SEC), which separates materials having different sizes by a size exclusion mechanism exploiting differences in retention time of the materials eluting through a column packed with spherical particles having various pore sizes. However, this method differs from the SEC in that it is incomparably simpler and more convenient, has at least 10 times higher material separation rate, and can separate a considerably larger amount of material. Compared with a Millipore micron centrifugal filter which is widely used in the biotechnology field, the hierarchically porous polymer of the present invention can separate materials by size in a much simpler and more reliable manner.

EXAMPLES

Hereinafter, the present invention will be described in further detail with reference to examples. It will be obvious to a person having ordinary skill in the art that these examples are for illustrative purposes only and are not to be construed to limit the scope of the present invention.

1,8-Diaza-bicyclo[5.4.0]undec-7-ene (DBU), potassium persulfate (KPS, >99%), sorbitan monooleate (Span 80), rhodamine B isothiocyanate-dextran with a weight-average molar mass ($M_w$) of 10 kg mol$^{-1}$ (RITC-Dex-10) and 70 kg mol$^{-1}$ (RITC-Dex-70), fluorescein isothiocyanate-dextran with $M_w$ of 70 kg mol$^{-1}$ (FITC-Dex-70), 150 kg mol$^{-1}$ (FITC-Dex-150), and 500 kg mol$^{-1}$ (FITC-Dex-500), and tetramethylrhodamine isothiocyanate-dextran with $M_w$ of 155 kg mol$^{-1}$ (TRITC-Dex-155) were purchased from Sigma-Aldrich (St. Louis, Mo., USA). Information from the vendor was used to describe their hydrodynamic diameters ($D_h$) in aqueous solution. Sodium chloride (NaCl, 99%) and calcium chloride dihydrate ($CaCl_2$) were purchased from Daejung Chemicals (Siheung, Korea) and Yukari Pure Chemical Co., LTD (Kyoto, Japan), respectively. d,l-Lactide was kindly provided by Corbion Purac (Amsterdam, Netherlands) and stored in a glove box after recrystallization from toluene. Styrene (S, 99%) and divinylbenzene (DVB) (technical grade, 80%) were filtered through basic alumina prior to use. HPLC grade toluene and dichloromethane (DCM) were purchased from Burdick & Jackson (Morristown, N.J., USA) and J. T. Baker (Center Valley, Pa.), respectively, and purified using a solvent purification system (C&T International, Suwon, Korea).

2-Hydroxyethyl 2-(((dodecylthio)carbonothioyl)-thio)-2-methylpropanoate) (CTA-OH) was prepared by esterification of 2-(dodecylthiocarbonothioylthio)-2-methylpropionic acid with excess of ethylene glycol. Polylactide macro-chain transfer agent (PLA-CTA) was synthesized by using CTA-OH as initiator and DBU as catalyst using a previously reported procedure (Oh, J. et al., *ACS Macro Lett.* 4, 1244-1248 (2015)). Table 1 summarizes characterization details of PLA-CTAs used in this example.

TABLE 1

| Entry | $M_{n,\,NMR}$ (kg mol$^{-1}$)$^a$ | $M_{n,\,SEC}$ (kg mol$^{-1}$)$^b$ | $Đ^b$ |
|---|---|---|---|
| PLA-CTA-7 | 7.4 | 15.5 | 1.09 |
| PLA-CTA-20 | 20.5 | 39.6 | 1.06 |
| PLA-CTA-25 | 25.0 | 50.2 | 1.07 |
| PLA-CTA-40 | 42.5 | 63.1 | 1.09 |
| PLA-OH-16 | 15.9 | 27.3 | 10.8 |

$^a$determined by final group analysis of $^1$H NMR
$^b$measured by SEC based on linear polystyrene calibration standards $^1$H nuclear magnetic resonance (NMR) signal was obtained using a Bruker Avance 400 MHz spectrometer (Bilerica, Mass., USA) using the residual NMR solvent signal as an internal reference. Size exclusion chromatography (SEC) was performed in chloroform at 40° C. with a flow rate of 1 mL min$^{-1}$ on an Agilent 1260 infinity system (Santa Clara, Calif., USA). The instrument is equipped with a 1260 refractive index detector and three PLgel 10 μm Mixed-B columns in series with a molar mass range of 500-10,000,000 g mol$^{-1}$. The molar masses of the polymers were calculated relative to linear polystyrene (PS) standards from Agilent Technologies. Fourier transform infrared (FTIR) spectra were obtained on a Bruker Alpha FTIR spectrometer using a Platinum attenuation total reflection (ATR) single reflection module.

Synchrotron small-angle X-ray scattering (SAXS) experiments were performed at the 9A beamline in Pohang Accelerator Laboratory (PAL). A monochromatized X-ray radiation source of 20.01 keV with a sample-to-detector distance of 6.455 m was used. Scattering intensity was monitored by a Mar 165 mm diameter CCD detector with 2048×2048 pixels. The two-dimensional scattering patterns were azimuthally integrated to afford one-dimensional profiles presented as scattering vector (q) versus scattering intensity, where the magnitude of scattering vector is calculated with an equation $q=4\pi/\lambda \sin\theta$. Domain spacing (d) was estimated from the position of the principal peak at q* following the relationship $d=2\pi/q^*$. Scanning electron microscope (SEM) images were obtained on a Hitachi S-4900 FE-SEM (Schaumburg, Ill., USA) with a 5 kV accelerating voltage and an upper secondary electron detector. Samples were coated with $O_s$ prior to imaging.

Nitrogen adsorption isotherms were obtained on a Mirae SI nanoPOROSITY-XQ analyzer (Gwangju, Korea) at the temperature of liquid nitrogen (77.3 K). Mode pore diameter ($D_{N2}$) was estimated by Barrett-Joyner-Halenda (BJH) analysis of the desorption branch of nitrogen sorption isotherms. Specific surface area ($S_{N2}$) was estimated by multipoint Brunauer-Emmett-Teller (BET) analysis (between $0.05<P/P_0<0.35$). Pore volume ($V_{N2}$) was calculated from the point $P/P_0=0.95$. Mercury porosimetry isotherms were obtained with a Micromeritics AutoPore III (Norcross, Ga., USA). The samples were evacuated under vacuum ($<3\times10^{-2}$ Torr) at room temperature prior to intrusion of mercury. Pore volume ($V_{Hg}$), pore size distribution, and specific surface areas ($S_{Hg}$) were determined using the Kelvin equation. The contact angle between the sample and mercury was estimated as 140°. The data was fitted using Gaussian functions assuming unimodal or bimodal distributions, and mode pore diameter ($D_{Hg}$) was determined from the fitted distribution.

Preparation Example 1: Preparation of h-polyHIPEs Using CaCl$_2$ Aqueous Solution A hierarchically porous polymerized high internal phase emulsion (h-polyHIPE) was synthesized which is derived from HIPE composed of 10 vol % oil phase containing 30 wt % of PLA-CTA-40 and 90 vol % aqueous phase with CaCl$_2$ concentration of 0.02 M. A polymerization mixture of styrene (S) (0.2053 g, 1.97 mmol), DVB (0.0642 g, 0.49 mmol), PLA-CTA-40 (0.1158 g, 0.0027 mmol), and Span 80 (0.037 g, 0.086 mmol) was prepared in a 4-mL vial and used as an oil phase. An aqueous solution consisting of deionized water (2.7 mL), KPS (0.0015 g, 0.0055 mmol), and CaCl$_2$ (0.0081 g, 0.055 mmol) was dropwisely added to the oil phase under vigorous mixing using a vortex mixer to form the HIPE. The HIPE was further mixed for 2-3 minutes after addition of the aqueous phase was completed. Then the vial was placed in an oil bath at 70° C. to polymerize the HIPE for 48 hours via the polymerization-induced microphase separation (PIMS) process. Microphase-separated polyHIPE (m-polyHIPE) was produced as a white and monolithic solid, which was collected by cracking the vial, washed with deionized water and methanol several times, and dried at under vacuum at room temperature overnight (0.3442 g, 89.4% mass yield).

h-polyHIPE was obtained by etching PLA from the m-polyHIPE precursor following the literature protocol (Seo, M. et al., *Science* 336, 1422-1425 (2012)). The m-polyHIPE (0.1336 g) was placed in a polypropylene vial and 20 mL of solution of 0.5 M NaOH (methanol/water=4/6 (v/v)) was poured over the sample. The vial was sealed with an electrical tape and heated in an oil bath at 70° C. for 48 hours. The h-polyHIPE was collected by draining the base solution and thoroughly rinsed with water and methanol sequentially. The remaining solvents were dried at ambient condition for 1 hour and then under vacuum at room temperature overnight (0.1058 g, 79.2% mass yield). The meso- and macropore structure of h-polyHIPE was evaluated by SAXS, nitrogen adsorption, and mercury intrusion porosimetry.

Preparation of RMP and polyHIPE

Reticulated mesoporous polymer (RMP) as cross-linked and mesoporous P(S-co-DVB) has been reported in the previous publication (Seo, M. et al., *Science* 336, 1422-1425 (2012)), and polyHIPE containing only macropores in the P(S-co-DVB) framework without the mesopores were synthesized as references in adsorption and separation experiments.

RMP was prepared by conducting copolymerization of styrene (S) and DVB ([S]:[DVB]=4:1 molar ratio) in the presence of 30 wt % PLA-CTA-40, without Span 80. A mixture of S, DVB and PLA-CTA-40 (10 vol %) was placed in a 20-ml vial containing 20 mM of KPS aqueous solution (90 vol %), and stirred for 48 hours at 70° C. The resulting monolithic pieces were subjected to PLA etching to produce RMP.

Figure 14:
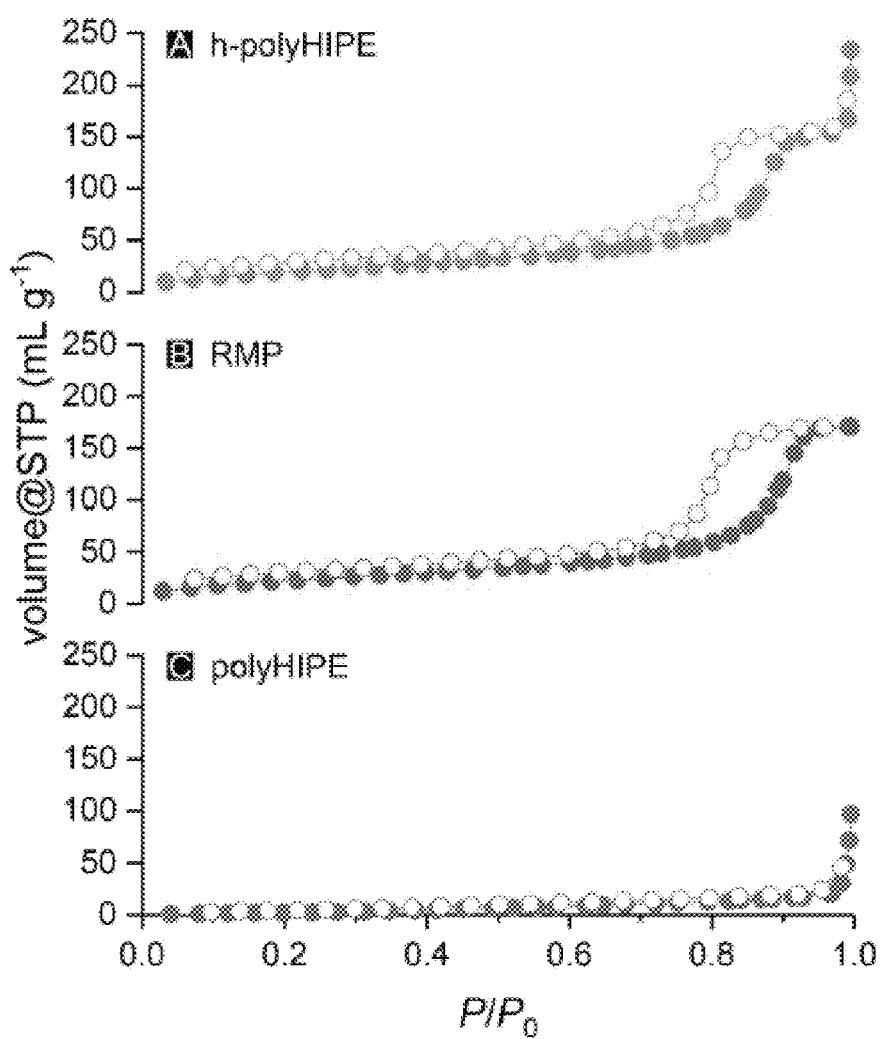
FIG. 14 shows nitrogen adsorption isotherms of h-polyHIPE (A), RMP (B) and polyHIPE (C) according to the present invention.

PolyHIPE was obtained from the HIPE composed of 10 vol % oil phase and 90 vol % aqueous phase. The composition of the aqueous phase was the same as that used in h-polyHIPE synthesis, whereas the oil phase was composed of styrene (S), divinylbenzene (DVB)([S]:[DVB]=4:1 molar ratio), and Span 80. The HIPE was polymerized at 70° C. for 48 hours, washed and dried to yield polyHIPE. Their nitrogen adsorption isotherms and pore characteristics are shown in FIG. 14 and Table 2, respectively.

TABLE 2

| Entry | $D_{N2}(nm)^a$ | $S_{N2}(m^2\ g^{-1})^a$ | $V_{N2}(mL\ g^{-1})^a$ |
|---|---|---|---|
| h-polyHIPE[b] | 10.9 | 79 | 0.21 |
| RMP | 10.9 | 122 | 0.28 |
| polyHIPE | —[c] | 16 | 0.03 |

[a]The mode pore diameter, surface area and pore volume measured from adsorption isotherm data.
[b]The same data as entry 1 of Table 3.
[c]No capillary condensation was observed.

Figure 6:
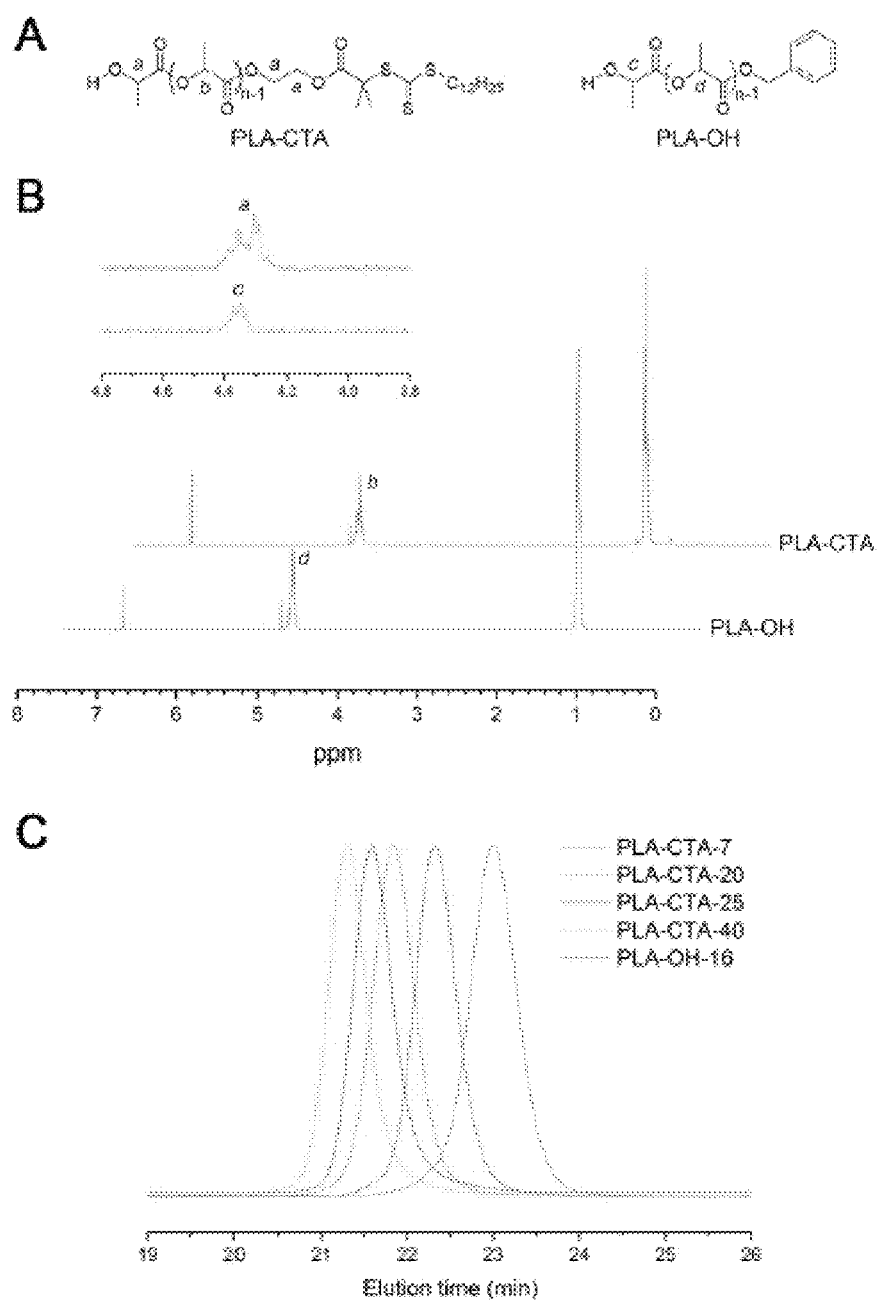
FIG. 6 in part (A) thereof shows the chemical structures of PLA-CTA and PLA-OH used in on example of the present invention; part (B) shows the $^1$H NMR spectra of PLA-CTA and PLA-OH (400 MHz, CDCl$_3$, 20° C.); and part (C) shows the SEC traces of PLA-CTA and PLA-OH (1 mL min$^{-1}$, chloroform, 40° C.) used in the present invention.
Figure 7:
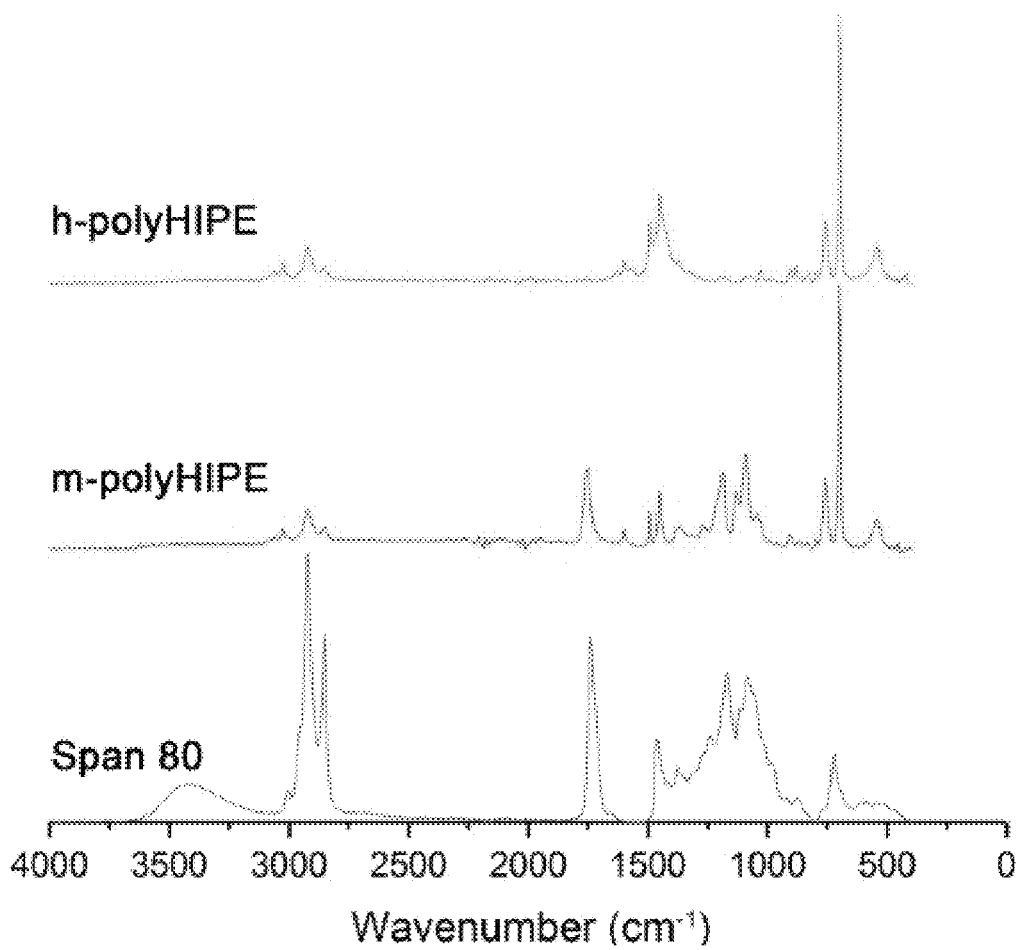
FIG. 7 shows the FTIR spectra of Span 80 (grey), m-polyHIPE (blue) and h-polyHIPE (orange) according to one example of the present invention.

To achieve a macroporosity of 90%, h-polyHIPE samples were typically synthesized from HIPEs composed of 10 vol % polymerization mixture and 20 mM of 90 vol % $CaCl_2$ aqueous solution. The weight composition of the polymerization mixture was S:DVB:PLA-CTA:Span 80=49:15:27:9 (292 mM of Span 80). This corresponds to 30 wt % of PLA in the oil phase, providing 3% of the mesoporosity in total. Several PLA-CTAs with different number-average molar masses ($M_n$) were used as listed in Table 1, and designated PLA-CTA-xx where xx represents $M_n$ value in kg mol$^{-1}$ (FIG. 6). The HIPE was prepared in a glass vial by gradually adding the aqueous solution to the polymerization mixture and vigorously mixing with a vortex machine at room temperature. The resulting white soft solid (FIG. 1 in part (A)) was polymerized in the vial with the cap closed at 70° C. The m-polyHIPE was obtained as a white monolithic solid, while maintaining the shape of the HIPE (FIG. 1 in part (B)). Treating the solid with an NaOH solution in a mixture of water and methanol removed the PLA and Span 80, as evidenced by FTIR (FIG. 7), yielding the h-polyHIPE with minimal change in macroscopic dimensions (FIG. 1 in part (C)). FIG. 7 shows peaks corresponding to the C=O stretches of PLA (1751 cm$^{-1}$) and Span 80 (1740 cm$^{-1}$). After the etching process, the C=O peaks clearly disappeared, indicating that PLA and Span 80 were removed.

Figure 8A:
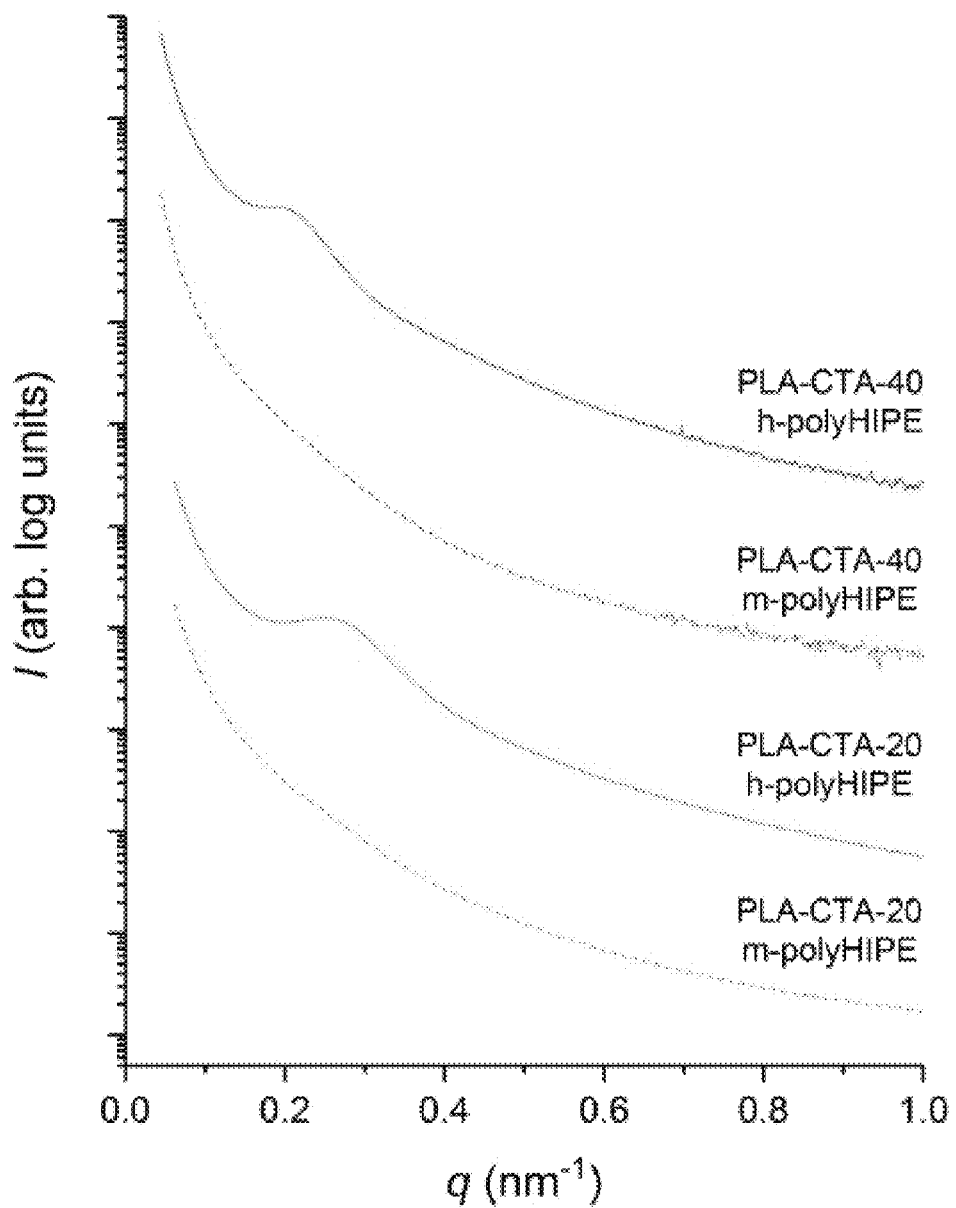
FIG. 8A shows one-dimensional SAXS profiles of the m-polyHIPE (dotted line) and h-polyHIPE (solid line) synthesized with PLA-CTA-40 (blue) and PLA-CTA-20 (orange) according one example (Preparation Example 1 of the present invention, and FIG. 8B shows one-dimensional SAXS profiles of the m-polyHIPE (dotted line) and h-polyHIPE (solid line) synthesized with PLA-CTA-40 according one example (Preparation Example 2) of the present invention.
Figure 8B:
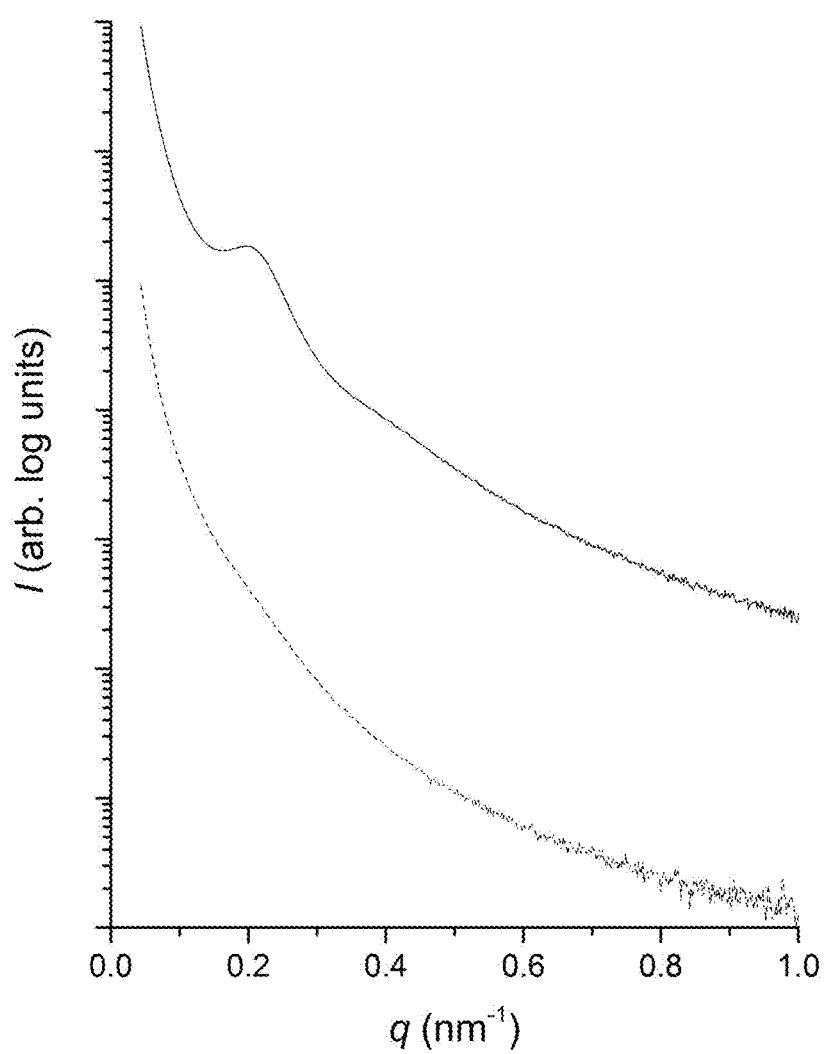

FIG. 2 shows scanning electron microscopy (SEM) images of the h-polyHIPE synthesized from PLA-CTA-40. At low magnification, the interconnected macropore structure originating from the HIPE appears as open micrometer sized cell-like spherical voids, with smaller "pore throats" connecting the voids (FIG. 2 in part (A)). Reticulated mesopores with sizes of about 10 nm spanning the entire framework are apparent at high magnification, consistent with the characteristic pore structure derived from PIMS (FIG. 2 in part (B)). The PIMS-derived mesopore structure was also confirmed by small angle X-ray scattering (SAXS), indicating a broad but distinct peak at the scattering vector (q*)=0.18 nm$^{-1}$ (corresponding to a domain spacing (d) of 35 nm) from the 3D continuous and disordered mesopore structure (FIGS. 8A and 8B).

Figure 9:
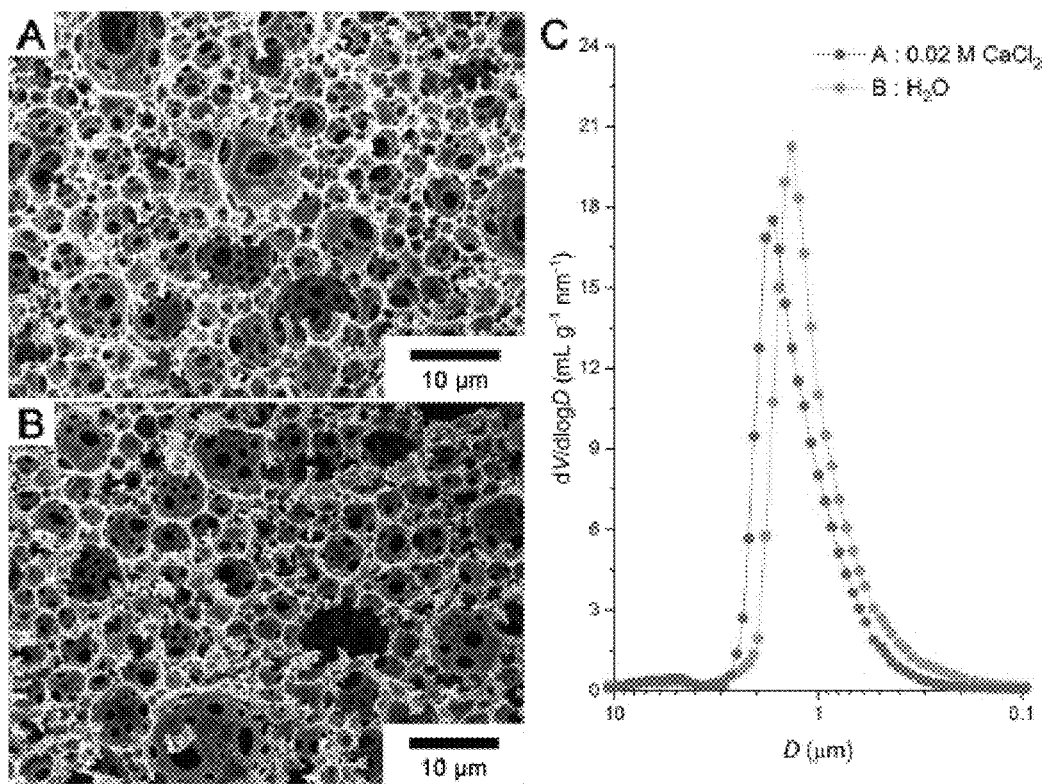
FIG. 9 shows low-magnification SEM images of h-polyHIPE prepared using an aqueous solution containing (part (A)) or not containing (part (B)) 20 mM CaCl$_2$) as an internal phase according to the present invention, and part (C) shows the pore size distribution of h-polyHIPE, measured by mercury intrusion porosimetry.
Figure 10A:
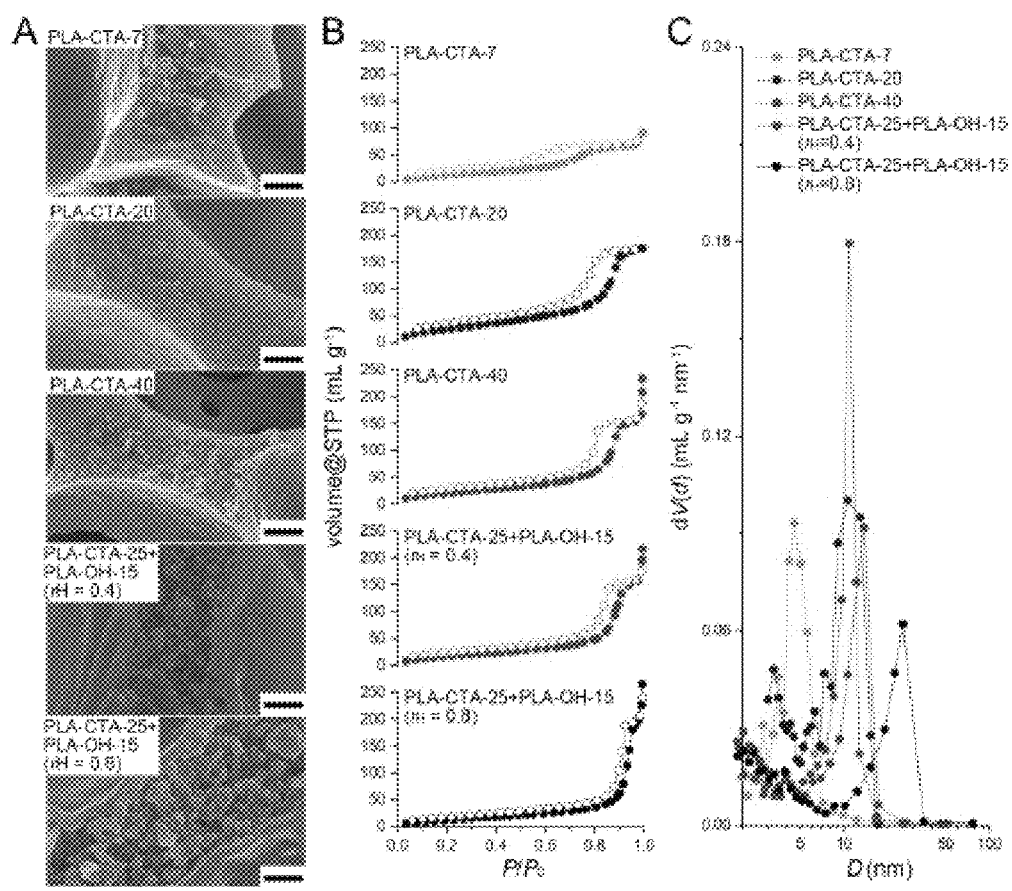
FIGS. 10A-10D show the mesopores of h-polyHIPE having controlled mesopore size according to the present invention.
Figure 10B:
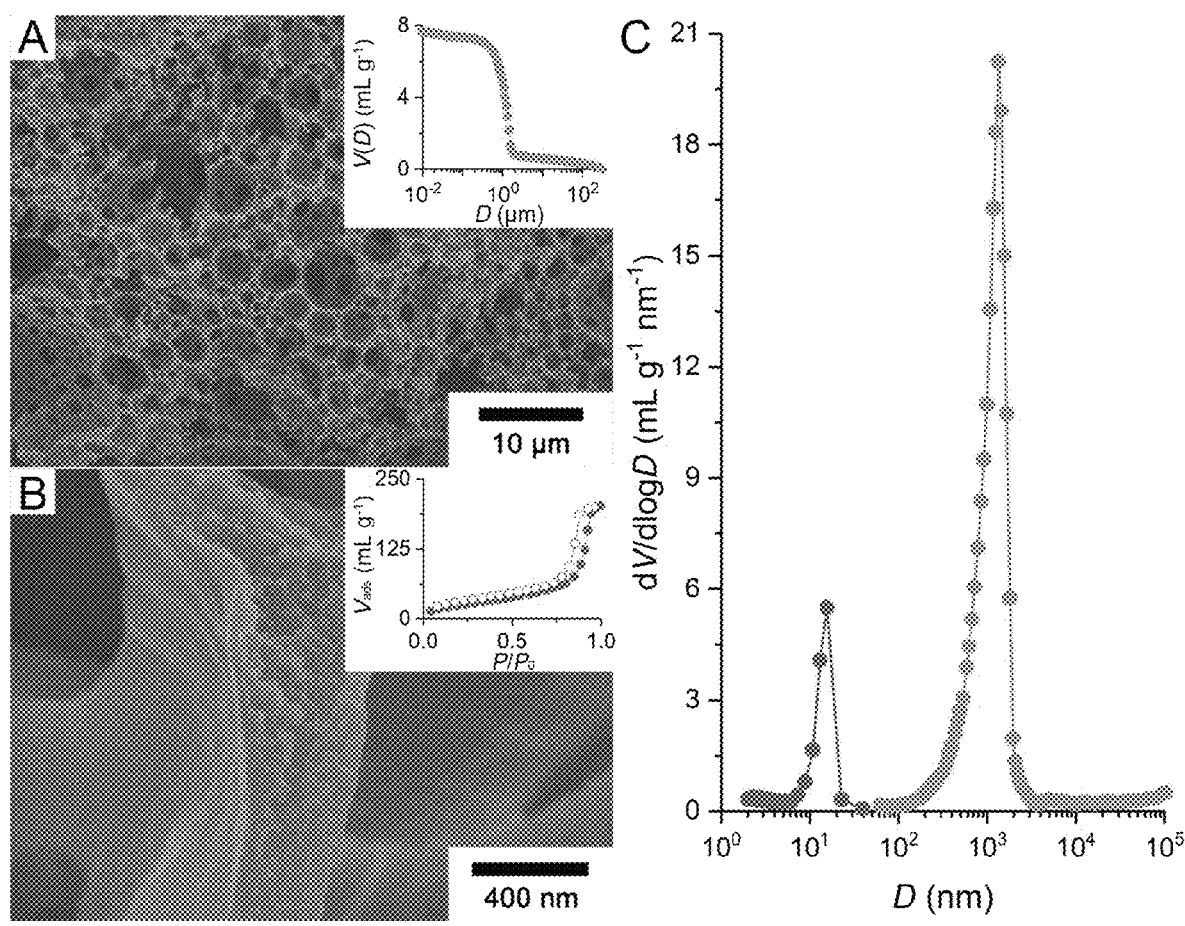

The hierarchical pore structure of the h-polyHIPE was further quantitatively characterized by combining mercury intrusion porosimetry and nitrogen adsorption measurements. Mercury intrusion porosimetry data indicated the h-polyHIPE had a porosity of 89% with a mode pore size of 1.66 μm, which is consistent with the macropore structure templated by the HIPE (FIG. 2 in part (A) inset). The nitrogen adsorption isotherm of the h-polyHIPE showed a H2-type hysteresis at high relative pressure due to capillary condensation in the mesoporous network, with a mode pore diameter of 10.8 nm, as estimated by Barrett-Joyner-Halenda (BJH) analysis (FIG. 2 in part (B) inset). The overlay of macro- and mesopore size distributions clearly corroborates the hierarchical pore structure (FIG. 2 in graph (C)). Pore characteristics of the h-polyHIPE is summarized in Table 3. We note that each pore size can be independently manipulated by adjusting the HIPE preparation conditions (FIG. 9 and Table 3) and varying the PLA microdomain size (FIGS. 10A and 10B, and Table 4). FIG. 10A in part (A) is a high-magnification SEM image of h-polyHIPE, which shows a reticulated mesoporous structure and the nitrogen adsorption isotherm in FIG. 10A in part (B) shows a change in mesopore size, obtained by changing the molecular weight of PLA-CTA and adding hydroxyl-terminated PLA (PLA-OH) as a selective additive. FIG. 10A in part (C) is a graph showing a mesopore size distribution obtained by BJH analysis of the desorption branch in the nitrogen adsorption isotherm.

By varying the molar mass of PLA-CTA and further adding hydroxyl-terminated PLA as an additive that selectively swells the PLA microdomain, h-polyHIPEs with a variety of mesopore sizes ranging from 7 nm to 25 nm by BJH analysis could be successfully prepared.

TABLE 3

Pore characteristics of h-polyHIPEs

| | | | Mesopore characteristics | | | Macropore characteristics | | |
|---|---|---|---|---|---|---|---|---|
| Entry | $M_{n,\ PLA\text{-}CTA}$ (kg mol$^{-1}$) | d (nm)$^a$ | $D_{N2}$ (nm)$^b$ | $S_{N2}$ (m$^2$ g$^{-1}$)$^b$ | $V_{N2}$ (mL g$^{-1}$)$^b$ | $D_{Hg}$ (nm)$^c$ | $S_{Hg}$ (m$^2$ g$^{-1}$)$^c$ | $V_{Hg}$ (mL g$^{-1}$)$^c$ |
| 1 | 40 | 34 | 10.8 | 79 | 0.21 | 1662 | 92 | 7.2 |
| 2$^d$ | 40 | 32 | 12.0 | 62 | 0.23 | 1346 | 156 | 7.8 |

[a]Domain spacing determined by SAXS
[b]Mode pore diameter, surface area, and pore volume estimated from nitrogen adsorption isotherm data
[c]Mode pore diameter, surface area, and pore volume estimated by mercury intrusion porosimetry
[d]h-polyHIPE synthesized by using deionized water without $CaCl_2$ as the internal phase

TABLE 4

| | | | Mesopore characteristics | | |
|---|---|---|---|---|---|
| Entry | $M_{n,\ PLA\text{-}CTA}$ (kg mol$^{-1}$) | $M_{n,\ PLA\text{-}OH}$ (kg mol$^{-1}$) | $r_H{}^a$ | $D_{N2}$ (nm)$^b$ | $S_{N2}$ (m$^2$ g$^{-1}$)$^b$ | $V_{N2}$ (mL g$^{-1}$)$^b$ |
| 1 | 7 | — | — | 4.5 | 58 | 0.09 |
| 2 | 20 | — | — | 10.2 | 102 | 0.23 |
| 3$^c$ | 40 | — | — | 10.8 | 79 | 0.21 |

TABLE 4-continued

| Entry | $M_{n, PLA-CTA}$ (kg mol$^{-1}$) | $M_{n, PLA-OH}$ (kg mol$^{-1}$) | $r_H{}^a$ | Mesopore characteristics | | |
|---|---|---|---|---|---|---|
| | | | | $D_{N2}$ (nm)$^b$ | $S_{N2}$ (m$^2$ g$^{-1}$)$^b$ | $V_{N2}$ (mL g$^{-1}$)$^b$ |
| 4 | 25 | 15 | 0.4 | 13.7 | 66 | 0.20 |
| 5 | 25 | 15 | 0.8 | 25.3 | 49 | 0.24 |

$^a$The ratio of the weight fractions of PLA-OH($w_{PLA-OH}$) and PLA-CTA($w_{PLA-CTA}$) in a reaction mixture ($r_H = w_{PLA-OH}/w_{PLA}$, where $w_{PLA} = w_{PLA-OH} + w_{PLA-CTA}$).
$^b$The mode pore diameter, surface area and pore volume, measured from nitrogen adsorption isotherm data.
$^c$The same data as entry 1 of Table 3.

Figure 11:
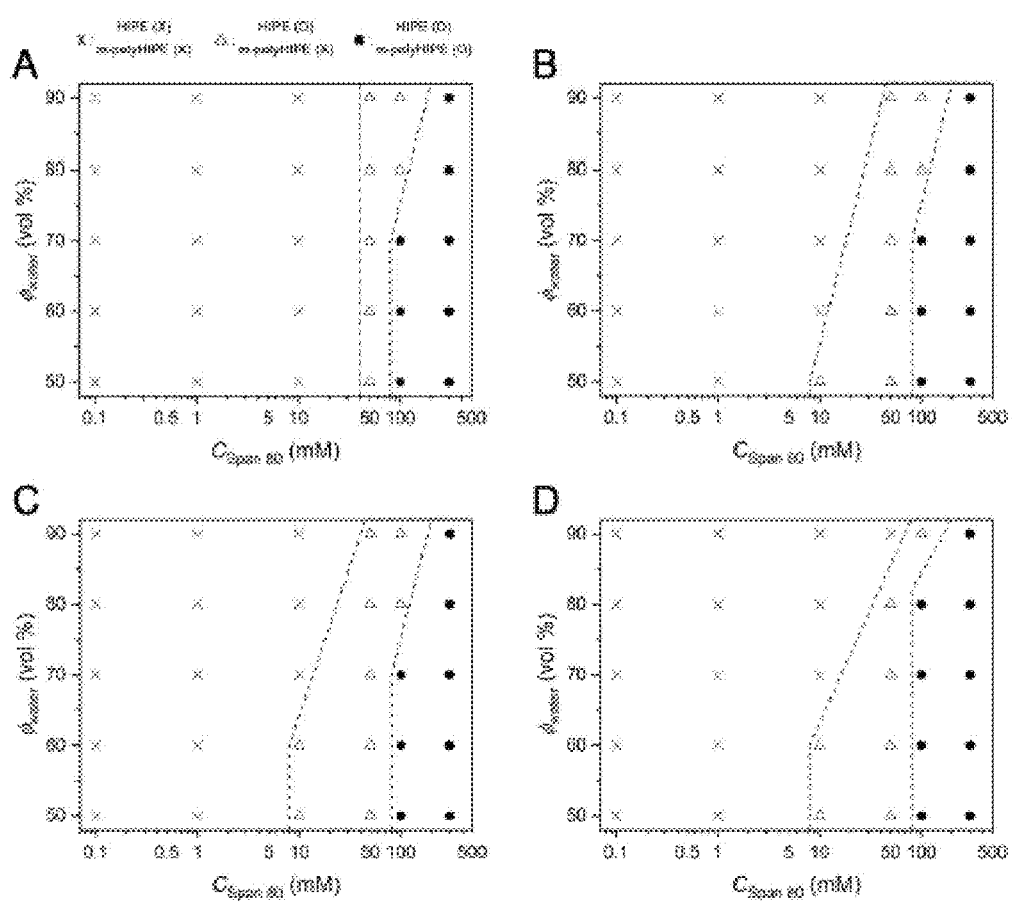
FIG. 11 shows phase diagrams for the stable HIPE and m-polyHIPE formation as a function of Span 80 concentration ($C_{Span\,80}$) vs. the internal phase volume fraction ($\phi_{water}$) at different weight fractions of PLA-CTA in the oil phase ($w_{PLA-CTA}$=30%).

It was found that h-polyHIPEs could be prepared in a wide range of composition. Meso- and macroporosities of the h-polyHIPEs were independently tunable by changing the weight fraction of PLA-CTA ($w_{PLA-CTA}$) in the oil phase, and the volume fraction of the aqueous phase ($\phi_{water}$) in the HIPE. the Span 80 concentration may need to be adjusted accordingly. See FIGS. 3 and 11 for the composition window as a function of Span 80 concentration. Different electrolytes such as NaCl could also be used to prepare the aqueous phase to replace CaCl$_2$.

Preparation Example 2: Preparation of h-polyHIPEs Using NaCl Aqueous Solution

A hierarchically porous polymerized high internal phase emulsion (h-polyHIPE) was synthesized which is derived from HIPE composed of 10 vol % oil phase containing 30 wt % of PLA-CTA-40 and 90 vol % aqueous phase with NaCl concentration of 0.02 M. A polymerization mixture of styrene (S) (0.1375 g, 1.32 mmol), DVB (0.0430 g, 0.33 mmol), PLA-CTA-40 (0.0773 g, 0.00182 mmol), and Span 80 (0.0267 g, 0.062 mmol) was prepared in a 4-mL vial and used as an oil phase. An aqueous solution consisting of deionized water (1.8 mL), KPS (0.0010 g, 0.0036 mmol), and NaCl (0.002 g, 0.03 mmol) was dropwisely added to the oil phase under vigorous mixing using a vortex mixer to form the HIPE. The HIPE was further mixed for 2-3 minutes after addition of the aqueous phase was completed. Then the vial was placed in an oil bath at 70° C. to polymerize the HIPE for 48 hours via the polymerization-induced microphase separation (PIMS) process. Microphase-separated polyHIPE (m-polyHIPE) was produced as a white and monolithic solid, which was collected by cracking the vial, washed with deionized water and methanol several times, and dried at under vacuum at room temperature overnight (0.2469 g, 86.8% mass yield).

h-polyHIPE was obtained by etching PLA from the m-polyHIPE precursor following the literature protocol (Seo, M. et al., Science 336, 1422-1425 (2012)). The m-polyHIPE (0.1395 g) was placed in a polypropylene vial and 20 mL of solution of 0.5 M NaOH (methanol/water=4/6 (v/v)) was poured over the sample. The vial was sealed with an electrical tape and heated in an oil bath at 70° C. for 48 hours. The h-polyHIPE was collected by draining the base solution and thoroughly rinsed with water and methanol sequentially. The remaining solvents were dried at ambient condition for 1 hour and then under vacuum at room temperature overnight (0.1033 g, 74.1% mass yield). The meso- and macropore structure of h-polyHIPE was evaluated by SAXS, nitrogen adsorption, and mercury intrusion porosimetry (Table 5).

TABLE 5

| Entry | $M_{n, PLA-CTA}$ (kg mol$^{-1}$) | d (nm)$^a$ | Mesopore characteristics | | | Macropore characteristics | | |
|---|---|---|---|---|---|---|---|---|
| | | | $D_{N2}$ (nm)$^b$ | $S_{N2}$ (m$^2$ g$^{-1}$)$^b$ | $V_{N2}$ (mL g$^{-1}$)$^b$ | $D_{Hg}$ (nm)$^c$ | $S_{Hg}$ (m$^2$ g$^{-1}$)$^c$ | $V_{Hg}$ (mL g$^{-1}$)$^c$ |
| 1 | 40 | 31 | 15.7 | 94 | 0.27 | 1346 | 156 | 7.75 |

$^a$Domain spacing determined by SAXS
$^b$Mode pore diameter, surface area, and pore volume estimated from nitrogen adsorption isotherm data
$^c$Mode pore diameter, surface area, and pore volume estimated by mercury intrusion porosimetry FIG. 10B in part (A) is a low-magnification SEM image and the mercury intrusion porosimetry data of h-polyHIPE, which support a high porous and bicontinuous macroporous structure. FIG. 10B in part (B) shows a high-magnification SEM image and a nitrogen adsorption isotherm of h-polyHIPE, indicating reticulated mesoporous structure formed in the macropore wall. FIG. 10B in part (C) is a graph showing a pore size distributions obtained by BJH analysis of the desorption branch in the nitrogen adsorption isotherm and mercury intrusion porosimetry, respectively. In addition, PIMS-derived mesoporous structure was wide but exhibited a clear peak in the scattering vector (q*)=0.20 nm$^{-1}$ (corresponding to domain spacing (d)=31 nm) in the 3D continuous and disordered mesoporous structures through small-angle X-ray scattering (SAXS) (FIG. 8B).

Even when NaCl is used as an electrolyte instead of CaCl$_2$ of the Preparation Example 1, it was confirmed that h-polyHIPE having micropores of a controlled size was successfully prepared.

Preparation Example 3: Preparation of h-polyHIPEs Using PLA-b-PPEGA Macro-Chain Transfer Agent PLA-b-PPEGA was synthesized to modify the surface of mesopores of a hierarchically porous polymer. A hierarchically porous polymerized high internal phase emulsion (h-polyHIPE) was synthesized which is derived from HIPE composed of 10 vol % oil phase containing 30 wt % of a corresponding macro-chain transfer agent (PLA-b-PPEGA) and 90 vol % aqueous phase with CaCl$_2$ concentration of 0.02 M. A polymerization mixture of styrene (S) (0.2070 g, 1.99 mmol), DVB (0.0650 g, 0.499 mmol), PLA-CTA-40 (0.1155 g, 0.00253 mmol), and Span 80 (0.076 g, 0.178 mmol) was prepared in a 4-mL vial and used as an oil phase. An aqueous solution consisting of deionized water (2.7 mL), KPS (0.0015 g, 0.0054 mmol), and CaCl$_2$ (0.008 g, 0.054 mmol) was dropwisely added to the oil phase under vigorous mixing using a vortex mixer to form the HIPE. The HIPE was further mixed for 2-3 minutes after addition of the aqueous phase was completed. Then the vial was placed in an oil bath at 70° C. to polymerize the HIPE for 48 hours via the polymerization-induced microphase separation (PIMS) process. Microphase-separated polyHIPE (m-polyHIPE) was produced as a white and monolithic solid, which was collected by cracking the vial, washed with deionized water and methanol several times, and dried at under vacuum at room temperature overnight (0.3898 g, 84.1% mass yield).

h-polyHIPE was obtained by etching PLA from the m-polyHIPE precursor following the literature protocol (Seo, M. et al., *Science* 336, 1422-1425 (2012)). The m-polyHIPE (0.3898 g) was placed in a polypropylene vial and 20 mL of solution of 0.5 M NaOH (methanol/water=4/6 (v/v)) was poured over the sample. The vial was sealed with an electrical tape and heated in an oil bath at 70° C. for 48 hours. The h-polyHIPE was collected by draining the base solution and thoroughly rinsed with water and methanol sequentially. The remaining solvents were dried at ambient condition for 1 hour and then under vacuum at room temperature overnight (0.2730 g, 70.0% mass yield). The meso- and macropore structure of h-polyHIPE was evaluated by nitrogen adsorption porosimetry (Table 6).

TABLE 6

| Entry | $M_{n, PLA-b-PPEGA}$ (kg mol$^{-1}$) | Mesopore characteristics | | |
|---|---|---|---|---|
| | | $D_{N2}$ (nm)$^b$ | $S_{N2}$ (m$^2$ g$^{-1}$)$^b$ | $V_{N2}$ (mL g$^{-1}$)$^b$ |
| 1 | 45.5 | 9.3 | 58 | 0.16 |

Figure 10C:
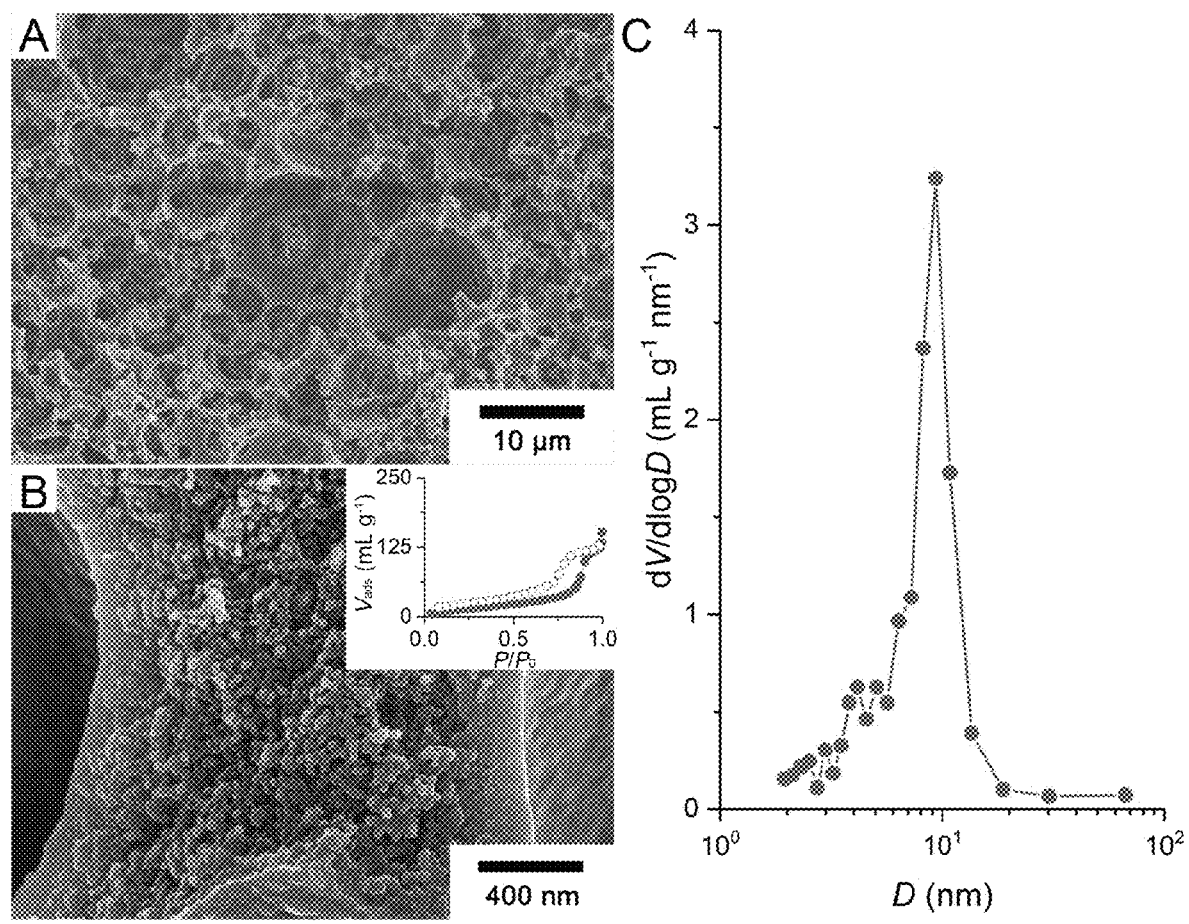

$^a$ Mode pore diameter, surface area, and pore volume estimated from nitrogen adsorption isotherm data FIG. 10C in part (A) is a low-magnification SEM image of h-polyHIPE, which support a bicontinuous macroporous structure. FIG. 10C in part (B) shows a high-magnification SEM image and a nitrogen adsorption isotherm of h-polyHIPE, indicating reticulated mesoporous structure formed in the macropore wall. FIG. 10C in part (C) is a graph showing a mesopore size distribution obtained by BJH analysis of the desorption branch in the nitrogen adsorption isotherm.

Even when PLA-b-PPEGA is added as a macro-chain transfer agent instead of PLA-CTA of the Preparation Example 1, it was confirmed that h-polyHIPE having mesopores of a controlled size as successfully prepared by BJH analysis.

Preparation Example 4: Preparation of h-polyHIPEs Using 4-tert-butylstyrene Monomer A hierarchically porous polymerized high internal phase emulsion (h-polyHIPE) was synthesized which is derived from HIPE composed of 10 vol % oil phase containing 30 wt % of PLA-CTA-40 and 90 vol % aqueous phase with $CaCl_2$ concentration of 0.02 M and using 4-tert-butylstyrene. A polymerization mixture of 4-tert-styrene (0.1605 g, 1.00 mmol), DVB (0.0302 g, 0.23 mmol), PLA-CTA-40 (0.0762 g, 0.00172 mmol), toluene (0.05 ml) and Span 80 (0.0258 g, 0.060 mmol) was prepared in a 4-mL vial and used as an oil phase. An aqueous solution consisting of deionized water (1.8 mL), KPS (0.0010 g, 0.0036 mmol), and $CaCl_2$ (0.002 g, 0.036 mmol) was dropwisely added to the oil phase under vigorous mixing using a vortex mixer to form the HIPE. The HIPE was further mixed for 2-3 minutes after addition of the aqueous phase was completed. Then the vial was placed in an oil bath at 70° C. to polymerize the HIPE for 48 hours via the polymerization-induced microphase separation (PIMS) process. Microphase-separated polyHIPE (m-polyHIPE) was produced as a white and monolithic solid, which was collected by cracking the vial, washed with deionized water and methanol several times, and dried at under vacuum at room temperature overnight (0.2819 g, 96.3% mass yield).

h-polyHIPE was obtained by etching PLA from the m-polyHIPE precursor following the literature protocol (Seo, M. et al., *Science* 336, 1422-1425 (2012)). The m-polyHIPE (0.1703 g) was placed in a polypropylene vial and 20 mL of solution of 0.5 M NaOH (methanol/water=4/6 (v/v)) was poured over the sample. The vial was sealed with an electrical tape and heated in an oil bath at 70° C. for 48 hours. The h-polyHIPE was collected by draining the base solution and thoroughly rinsed with water and methanol sequentially. The remaining solvents were dried at ambient condition for 1 hour and then under vacuum at room temperature overnight (0.1278 g, 75.0% mass yield). The meso- and macropore structure of h-polyHIPE was evaluated by SAXS, nitrogen adsorption, and mercury intrusion porosimetry.

TABLE 7

| Entry | $M_{n, PLA-CTA}$ (kg mol$^{-1}$) | Mesopore characteristics | | |
|---|---|---|---|---|
| | | $D_{N2}$ (nm)$^a$ | $S_{N2}$ (m$^2$ g$^{-1}$)$^a$ | $V_{N2}$ (mL g$^{-1}$)$^a$ |
| 1 | 40 | 13.5 | 62 | 0.15 |

Figure 10D:
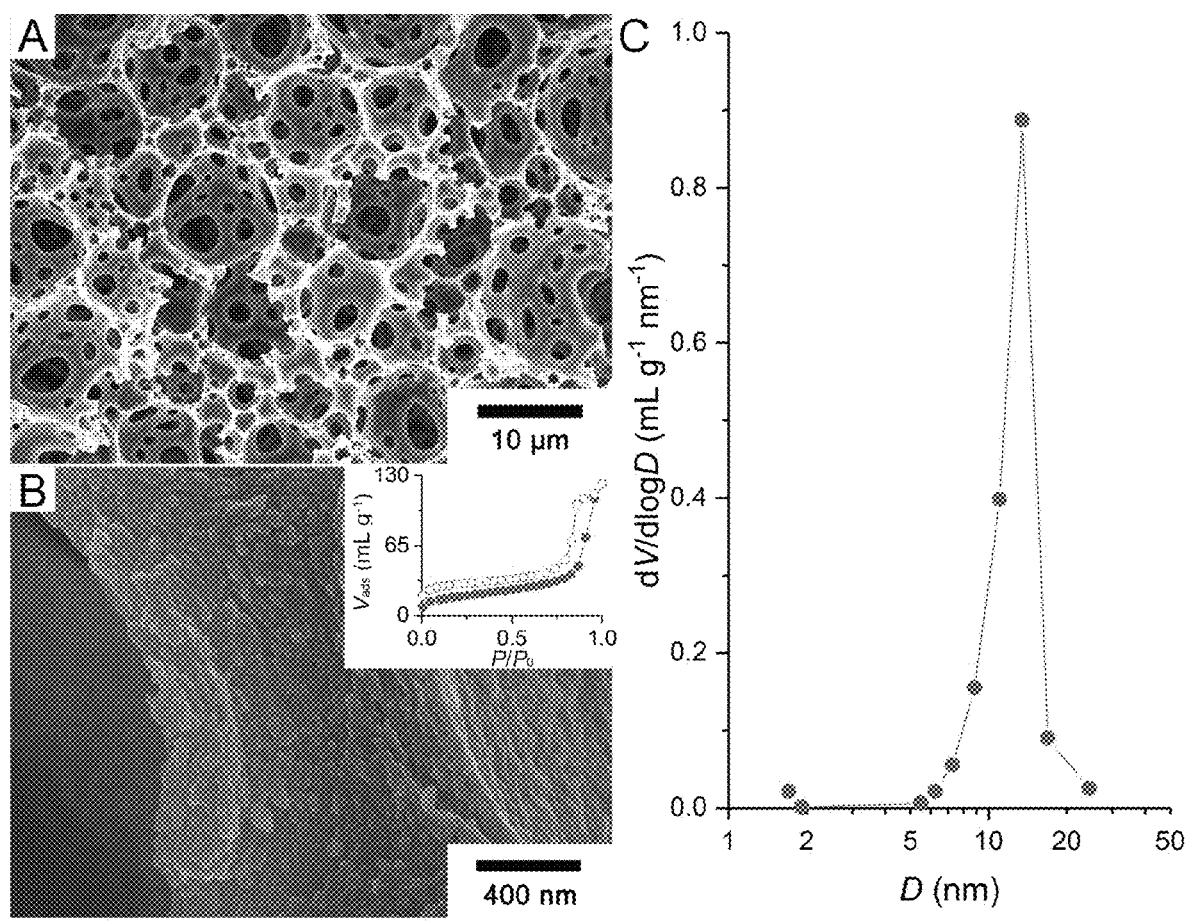

$^a$Mode pore diameter, surface area, and pore volume estimated from nitrogen adsorption isotherm data FIG. 10D in part (A) is a low-magnification SEM image and the mercury intrusion porosimetry data of h-polyHIPE, which support a high porous and bicontinuous macroporous structure. FIG. 10D in part (B) shows a high-magnification SEM image and a nitrogen adsorption isotherm of h-polyHIPE, indicating reticulated mesoporous structure formed in the macropore wall. FIG. 10D in part (C) is a graph showing a mesopore size distribution obtained by BJH analysis of the desorption branch in the nitrogen adsorption isotherm.

Even when 4-tert-styrene is added as a monomer instead of styrene, it was confirmed that h-polyHIPE having mesopores of a controlled size was successfully prepared by BJH analysis.

Example 1: Interfacial Tension Measurement

Interfacial tension between oil and aqueous phases was measured by using a customized pendent drop method. The oil solution was transferred to a quartz cuvette (Sigma-Aldrich, 3.5 mL volume), and a microsyringe (Hamilton, 710SNR, 100 µL) containing the aqueous solution was then immersed in the oil phase. Then, a pendent drop was formed at the end of the syringe needle, and the drops were recorded for 15 to 30 minutes through the side of the cuvette. Finally, the interfacial tension was calculated from a shape analysis of each pendent drop using a customized Matlab code.

Example 2: Rheology Measurement

The rheological properties of high internal phase emulsions were measured using a conventional rheometer (MCR 302, Anton Paar) with parallel plate geometry (1 mm-gap, 25 mm-diameter). Two different modes of an oscillatory shear rheology were applied for identifying the rheological properties of the HIPEs, such as a frequency sweep mode and an amplitude sweep mode. In the frequency sweep mode, shear moduli were measured at fixed strain amplitude (0.1%) with varying angular frequencies from 0.1 to 100 rad s$^{-1}$ while in the amplitude sweep mode, shear moduli at a fixed frequency (10 rad s$^{-1}$) were measured with strain amplitudes ranging from 0.01% to 100% (0.0001 to 1).

To produce m-polyHIPE, stabilization of the oil/water interface by Span 80 is important, so that the PIMS process occurs in the confined oil phase of HIPE. The present inventors investigated the stability of the HIPE and the m-polyHIPE as a function of Span 80 concentration to identify the optimum composition window for synthesis of the h-polyHIPE (FIG. 3 in graphs (A) and (B), and FIG. 11). Increasing volume fraction of the aqueous phase ($\varphi_{water}$) increased the oil/water interfacial area and decreased the stability of the HIPE, requiring more Span 80 to cover the interface. Increasing $w_{PLA-CTA}$ also decreased the HIPE stability and needed more Span 80 to compensate the instability induced by the PLA-CTA. For $w_{PLA-CTA}$=30%, more than 100 mM of Span 80 was sufficient to form HIPEs with $\varphi_{water}$=90 vol %, but 300 mM was required to maintain the integrity of the HIPE during polymerization.

With increasing Span 80 concentration, the interfacial tension between the aqueous phase and the polymerization mixture exhibited a continuous decay, followed by a plateau above 10 mM regardless of $w_{PLA-CTA}$, implying that this is the critical micelle concentration of Span 80 in the polymerization mixture (FIG. 3 in part (C)). Since the minimum Span 80 concentration needed to achieve stable HIPE is far higher than the CMC, micelle formation may contribute to HIPE stability by additionally stabilizing the dispersed droplets sterically and entropically against coalescence. The present inventors also observed that the characteristic time ($\tau$) to reach equilibrium tension became longer as $w_{PLA-CTA}$ increased (FIG. 3 in part (D)), presumably because the increased bulk viscosity of the oil phase slows down diffusion of Span 80 towards the interface. Thus, the present inventors posit that sufficient Span 80 should be present in the polymerization mixture to promptly cover the interface continuously created during the emulsification process, and to further stabilize the aqueous droplet by micelle formation.

Figure 12:
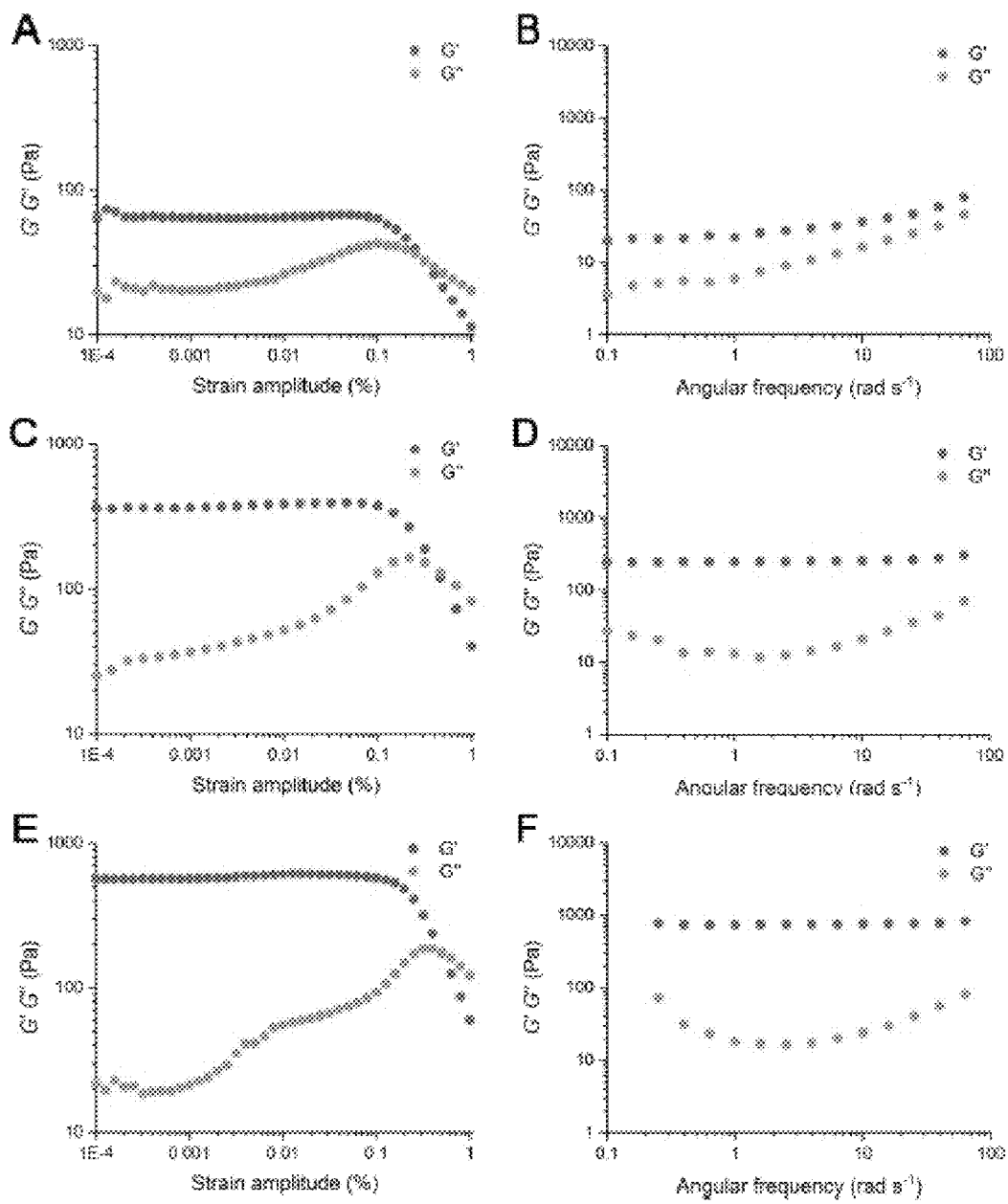
FIG. 12 shows strain amplitude sweep (graphs A, C and E) frequency sweep (graphs B, D and F) data obtained by oscillatory shear measurement of HIPE containing 30 wt % of PLA-CTA-20 in an oil phase having $C_{Span\,80}$ so according to the present invention.
Figure 13:
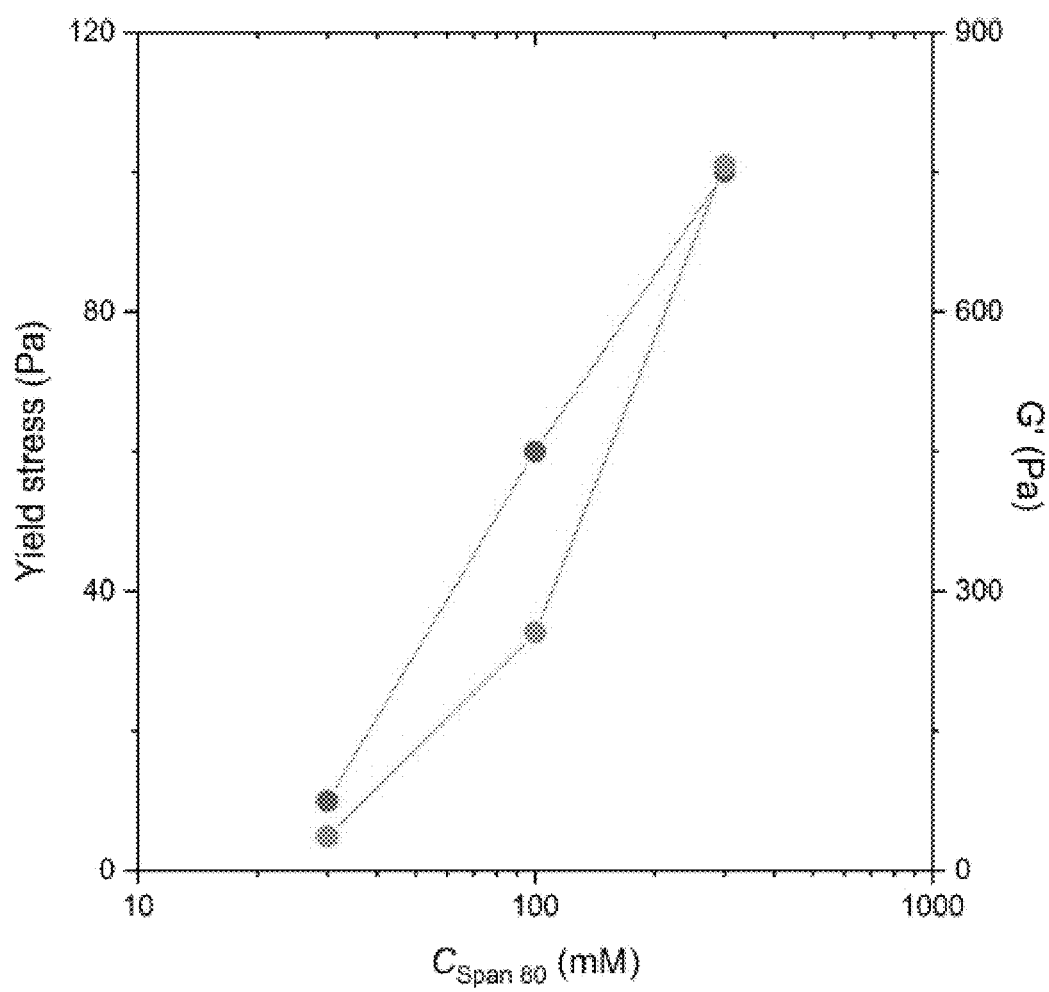
FIG. 13 shows the elastic modulus and yield stress of HIPE, measured by oscillatory shear measurement with increasing $C_{Span\,80}$ according to the present invention.

Oscillatory shear measurements of the HIPEs confirmed that the HIPE is a soft solid whose elastic modulus and yield stress increase with increasing Span 80 concentration (FIGS. 12 and 13). 300 mM of Span 80 provides a yield stress of about 100 Pa, which seems to be necessary to withstand the internal stress during polymerization at 70° C., and avoid collapse of the HIPE. This also indicates that the HIPE can be processed into desirable shapes by applying proper stress. Then, h-polyHIPE monoliths with the preset dimension can be derived by polymerization followed by PLA etching, and further shaped by cutting the monolith.

Example 3: Measurement of Adsorption Capacity (Q)

To investigate sorption kinetics of dye-tagged dextran, fluorescence intensity of aqueous solutions containing the dextran was monitored using a Tecan Infinite Pro M200 microplate spectrofluorometer (Männedorf, Switzerland) at room temperature. Excitation wavelengths of 460 and 470 nm were used for RITC-Dex and TRITC-Dex, respectively. Absorbance of aqueous solutions containing dye-tagged dextran mixtures was measured using a Shimadzu UV-2600 UV-vis spectrophotometer (Kyoto, Japan) at room temperature for determination of concentration of individual dextrans. A piece of h-polyHIPE, polyHIPE and RMP (10 mg) was prewetted with methanol for 1 h and placed in 20-ml vials. 10 mL of RITC-Dex-10 aqueous solution (100 μg mL$^{-1}$) was added to each vial. The solutions were gently stirred at room temperature, and fluorescence intensity of the solutions was measured over time to determine their concentration based on the predetermined calibration curve. From the extent of the concentration decrease, the amount of RITC-Dex-10 adsorbed on the polymer was estimated and normalized by the weight of the polymer to yield Q. The adsorption capacity for RITC-Dex-70 and TRITC-Dex-155 was also determined by the same procedure.

Figure 15:
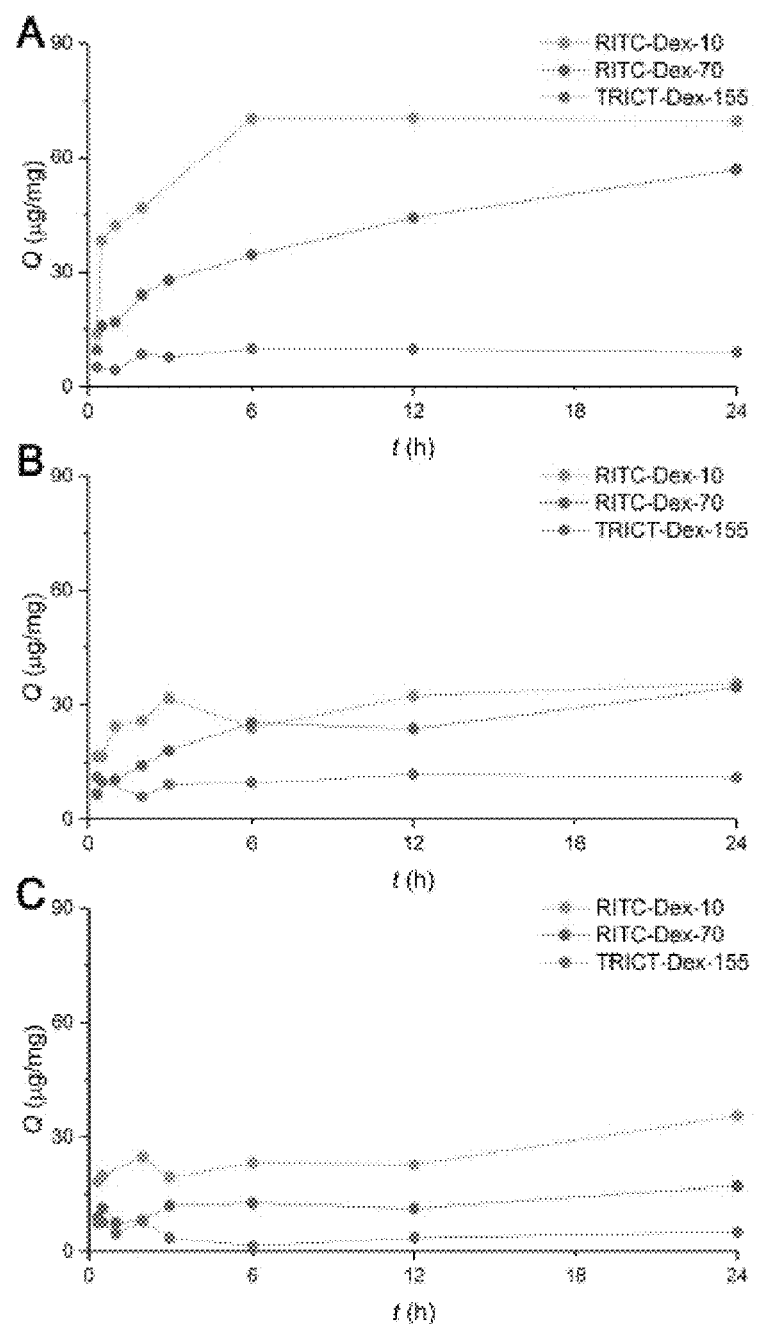
FIG. 15 shows the adsorption capacities of h-polyHIPE (A), polyHIPE (B) and RMP (C) for RITC-Dex-10, RITC-Dex-70 and TRITC-Dex-155 solutions according to the present invention.
Figure 16:
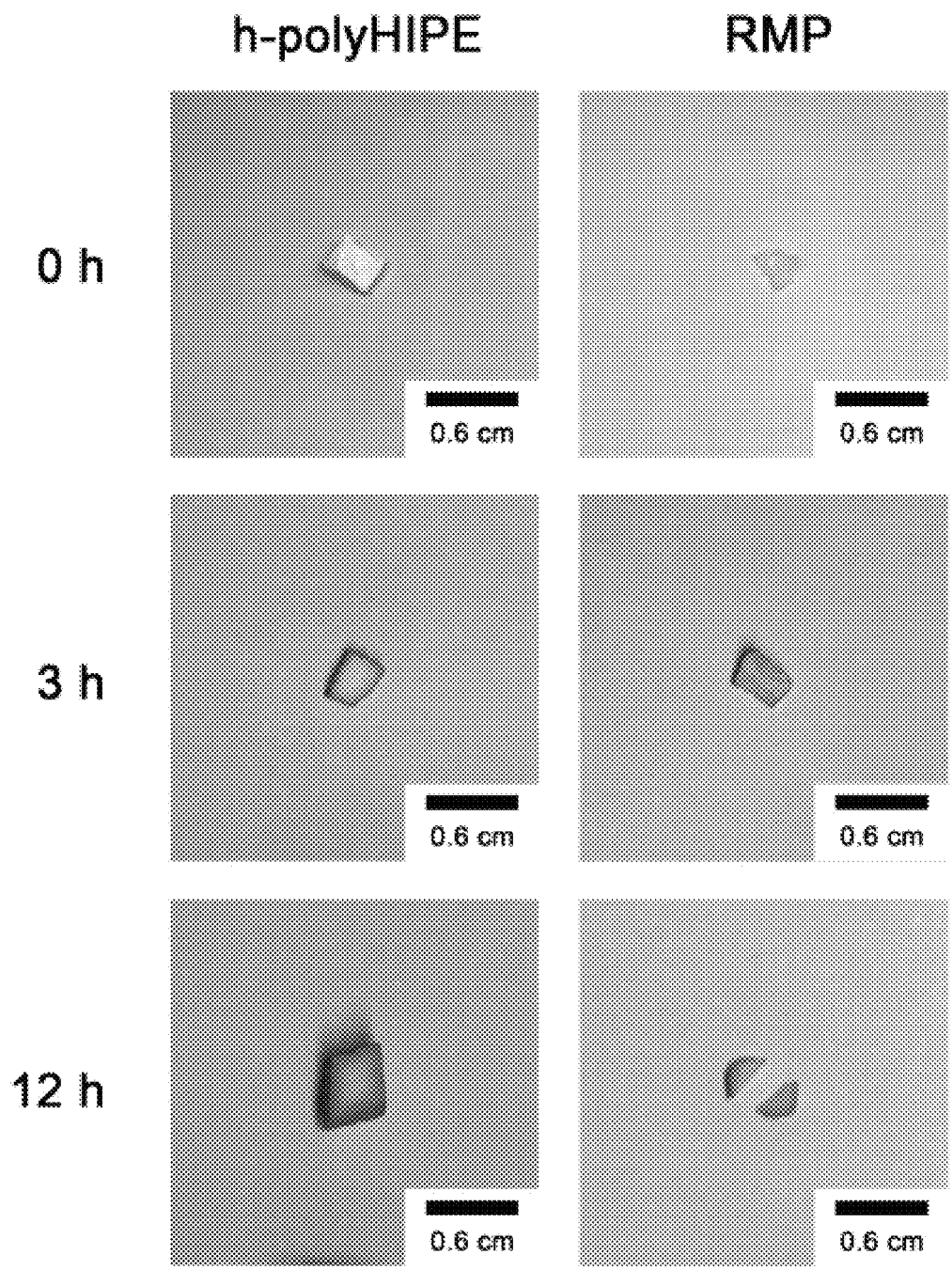
FIG. 16 shows cross-section images of h-polyHIPE and RMP after immersing in an RITC-Dex-10 solution for 0, 3, and 12 hours according to the present invention.

The h-polyHIPE showed mesopore size-dependent adsorption behavior for polymer aqueous solutions. The adsorption capacity (Q) of the h-polyHIPE which was synthesized with PLA-CTA-40 for Rhodamine B isothiocyanate-dextran with a weight-average molar mass ($M_w$)=10 kg mol$^{-1}$ (RITC-Dex-10, hydrodynamic diameter ($D_h$)=4.6 nm) was more than two times higher than polyHIPE and RMP, which possessed only macropores and mesopores, respectively (FIG. 4 in parts (A) and (B), FIG. 14, FIG. 15, and Table 2), indicating the synergistic effect of the hierarchical pore structure.

The cross-section image of the h-polyHIPE after immersing in the aqueous solution of RITC-Dex-10 indicates progressive adsorption deep into the monolith, suggesting facile diffusion through the macroporous space towards mesopores exposed on the macropore surface. This supports that the pores with different sizes are mutually connected in the h-polyHIPE and all the mesopores can be fully accessible for the adsorption. In contrast, adsorption in the RMP mostly occurred on the monolith surface, presumably due to limited diffusion through mesopores and subsequent clogging.

RITC-Dex-70 with $D_h$=12.0 nm, which is comparable to the mesopore size, showed increasing Q slowly over time, indicating high resistance to diffusion into the mesopore (FIG. 4 in part (B)). When tetramethylrhodamine-tagged dextran with $M_w$=155 kg mol$^{-1}$ (TRITC-Dex-155, $D_h$=17 nm) was used, h-polyHIPE exhibited a low Q similar to the polyHIPE, suggesting that adsorption occurred mainly in the macropores, as the polymer was larger than the mesopore.

Example 4: Size-Selective Separation

The procedure used for the separation of RITC-Dex-10 and FITC-Dex-500 shown in FIG. 4 in part (C) thereof will be described in detail as an example. h-polyHIPE monolith fabricated into a cylindrical shape with a diameter of 1.2 cm and a thickness of 1.0 cm (corresponding to about 123 mg) was plugged into a 5-mL Henke-Sass Wolf GmbH NormJect disposable syringe (Tuttlingen, Germany). 3 mL of an aqueous solution containing RITC-Dex-10 (910 μg mL$^{-1}$) and FITC-Dex-500 (1070 μg mL$^{-1}$) was loaded on top of the h-polyHIPE "plug" and the solution was eluted by applying pressure with a plunger. The volume of the eluent was 2.9 mL on average. Retention efficiency was estimated by measuring the absorbance of the solution before and after elution through the h-polyHIPE, and comparing the intensity at 494 nm and 555 nm with the predetermined calibration curve to determine the concentration of FITC-Dex-500 and RITC-Dex-10, respectively, and tabulated in Table 5. For comparison, the identical solution was subjected to the polyHIPE monolith with the same dimension as shown in FIG. 4 in parts (E) and (F) thereof, and the retention efficiency is indicated in Table 8.

TABLE 8

RITC-Dex-10/FITC-Dex-500 mixture

| | Before elution | | After elution | | Retention efficiency (%) | |
|---|---|---|---|---|---|---|
| | FITC- | RITC- | FITC- | RITC- | | |
| Separation medium | Dex-500 ($\mu g\ mL^{-1}$) | Dex-10 ($\mu g\ mL^{-1}$) | Dex-500 ($\mu g\ mL^{-1}$) | Dex-10 ($\mu g\ mL^{-1}$) | FITC-Dex-500 | RITC-Dex-10 |
| h-polyHIPE (PLA-CTA-20)[a] | 1070 | 910 | 840 | 30 | 21.5 | 96.7 |
| PolyHIPE[b] | 1070 | 910 | 880 | 450 | 17.8 | 50.1 |
| Microcon® | 980 | 1040 | 870 | 670 | 11.2 | 35.6 |
| HiTrap | 980 | 1040 | 970 | 670 | 10.2 | 35.6 |

RITC-Dex-70/FITC-Dex-150 mixture

| | Before elution | | After elution | | Retention efficiency (%) | |
|---|---|---|---|---|---|---|
| | FITC- | RITC- | FITC- | RITC- | | |
| Separation medium | Dex-150 ($\mu g\ mL^{-1}$) | Dex-70 ($\mu g\ mL^{-1}$) | Dex-150 ($\mu g\ mL^{-1}$) | Dex-70 ($\mu g\ mL^{-1}$) | FITC-Dex-150 | RITC-Dex-70 |
| h-polyHIPE (PLA-CTA-20)[a] | 940 | 980 | 880 | 20 | 6.4 | 98.0 |
| Microcon® | 670 | 1030 | 700 | 590 | 0 | 42.7 |
| HiTrap | 940 | 1010 | 710 | 750 | 24.5 | 25.7 |

RITC-Dex-10/FITC-Dex-70 mixture

| | Before elution | | After elution | | Retention efficiency (%) | |
|---|---|---|---|---|---|---|
| | FITC- | RITC- | FITC- | RITC- | | |
| Separation medium | Dex-70 ($\mu g\ mL^{-1}$) | Dex-10 ($\mu g\ mL^{-1}$) | Dex-70 ($\mu g\ mL^{-1}$) | Dex-10 ($\mu g\ mL^{-1}$) | FITC-Dex-70 | RITC-Dex-10 |
| h-polyHIPE (PLA-CTA-7)[c] | 500 | 1010 | 480 | 4 | 4.0 | 99.6 |
| Microcon® | 340 | 830 | 320 | 380 | 5.9 | 54.2 |
| HiTrap | 500 | 1150 | 490 | 600 | 2.0 | 47.8 |

[a] The same h-polyHIPE as described in entry 2 of Table 4.
[b] The same polyHIPE as described in Table 2.
[c] The same h-polyHIPE as described in entry 1 of Table 4.

This procedure was also applied to mixtures of dye-tagged dextrans with different molar masses (see FIG. 5), and their retention efficiency values are included in Table 5. To separate a mixture of RITC-Dex-10 and FITC-Dex-70, h-polyHIPE prepared with PLA-CTA-7 was used. h-polyHIPE monolith having a diameter of 1.2 cm, a thickness of 0.9 cm, and a mass of 111 mg was used to separate a mixture of RITC-Dex-10 (990 $\mu g\ mL^{-1}$) and FITC-Dex-70 (450 $\mu g\ mL^{-1}$). In addition, h-polyHIPE prepared with PLA-CTA-20 having a diameter of 1.2 cm, a thickness of 1.2 cm, and a mass of 148 mg was used for a mixture of RITC-Dex-70 (980 $\mu g\ mL^{-1}$) and FITC-Dex-150 (940 $\mu g\ mL^{-1}$). The amount of the h-polyHIPE monolith was varied to control the adsorbed amount of dextrans with $M_w$=70 kg $mol^{-1}$ during elution. Note that the lower concentration of FITC-Dex-70 was used when compared with the other dextrans because of its higher absorption extinction coefficient.

To compare efficiency of the size-selective separation provided by the h-polyHIPE with commercial products, RITC-Dex-10/FITC-Dex-500, RITC-Dex-10/FITC-Dex-70 and RITC-Dex-70/FITC-Dex-150 mixtures were applied to the centrifugal filtration process by using Millipore Microcon® centrifugal filter (Darmstadt, Germany) with a nominal molecular weight cut off of 30 kg $mol^{-1}$ and HiTrap desalting column (GE Healthcare Bio-Science AB, Uppsala, Sweden).

For centrifugal filtration, 0.5 mL of the aqueous solution was loaded on the top of the filter inserted in a 1.5-mL micro-centrifuge tube. The tube was closed and centrifuged for 10 min at 14,000×g using Tomy Kogyo Kitman-T24 (Tokyo, Japan), following the conditions recommended by the manufacturer. Then the concentrate was recovered by diluting with 0.5 mL of deionized water. Absorbance of solution was measured to determine filtration efficiency for each component. The filtration process and efficiency are shown in FIG. 17 and Table 5.

Figure 17:
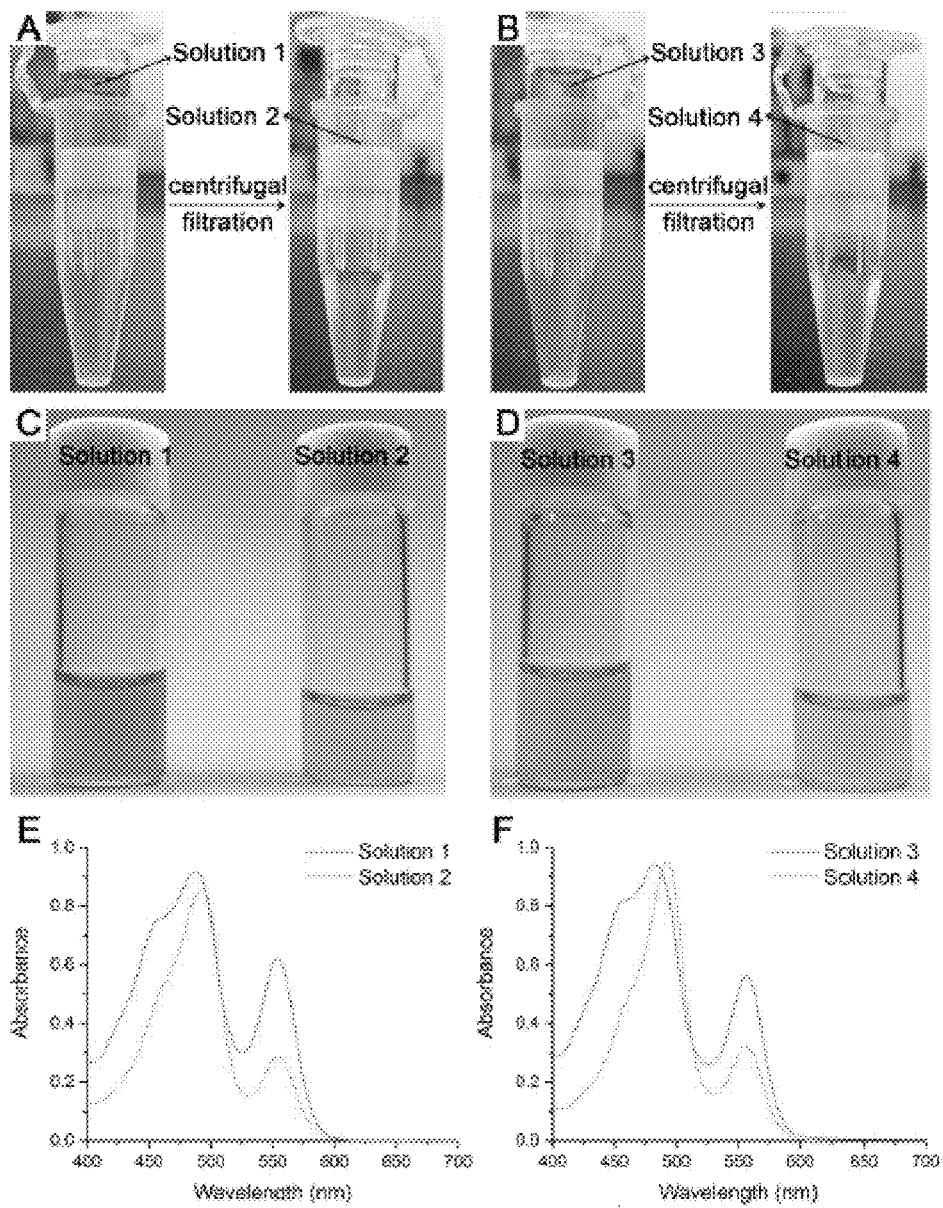
FIG. 17 shows photographs of separated dye solutions and the results of measuring the absorbance of the solutions.

FIG. 17 in parts (A) and (B) show photographs of dye-tagged dextran solutions before and after centrifugal filtration. As shown in FIG. 17 in part (A), solutions containing RITC-Dex-10 (830 $\mu g\ mL^{-1}$) and FITC-Dex-70 (340 $\mu g\ mL^{-1}$) were subjected to centrifugal filtration using Microcon® centrifugal filter. As shown in FIG. 17 in part (B), solutions containing RITC-Dex-70 (1030 $\mu g\ mL^{-1}$) and FITC-Dex-150 (670 $\mu g\ mL^{-1}$) were subjected to centrifugal filtration using Microcon® centrifugal filter. FIG. 17 in parts (C) and (D) show photographs of solutions before (1 and 3) and after (2 and 4) centrifugation performed using a centrifugal filter, and FIG. 17 in parts (E) and (F) shows the absorbance spectra of the solutions.

In case of the HiTrap desalting column, 1.5 mL of a solution containing dye tagged dextrans was loaded on the desalting column after equilibration with water by using a syringe pump (KD Scientific, Holiston, USA) with a constant speed of 0.5 ml min$^{-1}$. Then 1.5 mL of water was eluted through the column again using the syringe pump with the constant speed of 0.5 ml min$^{-1}$. 1.5 mL of the eluent was collected and its absorbance was measured to determine retention efficiency of each dextran. The separation process is shown in FIG. 18, and the retention efficiency values are tabulated in Table 5.

Figure 18:
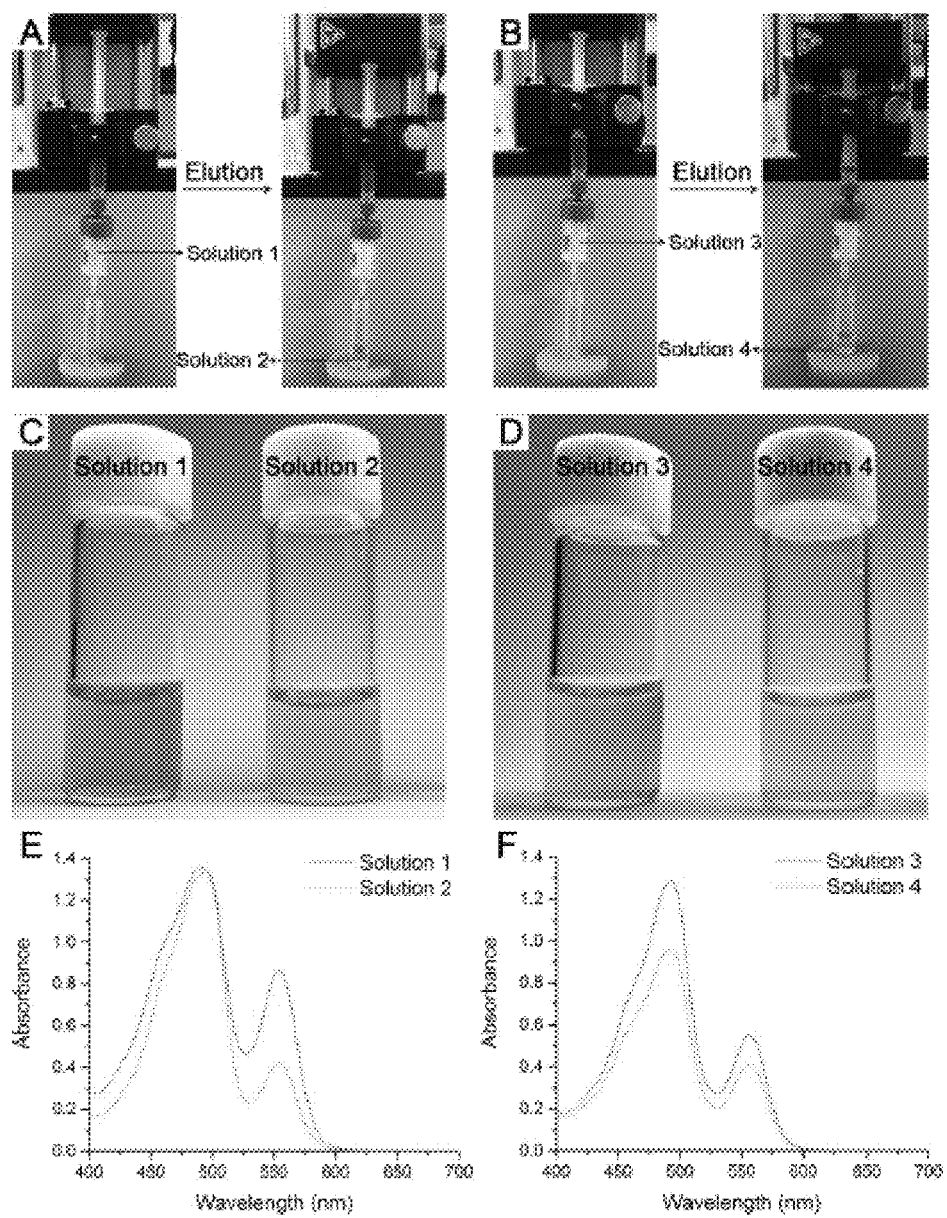
FIG. 18 shows photographs of dye solutions separated using a HiTrap desalting column for comparison with the present invention and the results of measuring the absorbance of the solutions.

FIG. 18 in parts (A) and (B) shows photographs of dye-tagged dextran solutions before and after elution through a desalting column. FIG. 18 in part (A) shows elution of solutions containing RITC-Dex-10 (1150 μg mL$^{-1}$) and FITC-Dex-70 (500 μg mL$^{-1}$) through a HiTrap desalting column, and FIG. 18 in part (B) shows elution of solutions containing RITC-Dex-70 (1010 μg mL$^{-1}$) and FITC-Dex-150 (940 μg mL$^{-1}$) through a HiTrap desalting column. FIG. 18 in parts (C) and (D) shows photographs of solutions before (1 and 3) and after (2 and 4) filtration through a HiTrap desalting column, and FIG. 18 in graphs (E) and (F) shows the absorbance spectra of the solutions.

The present inventors utilized the size-dependent adsorption and the high hydraulic conductivity features of h-polyHIPE to demonstrate rapid and highly efficient separation of polymer mixtures based on their molar masses, by simply eluting the solution through the h-polyHIPE. The separation mechanism is totally different from the conventional size-exclusive filtration where substrates larger than the pore are filtered off. In the h-polyHIPE, substrates smaller than the mesopore are selectively retained in the mesopores by adsorption, while the larger is excluded from the mesopore and eluted through the interconnected macroporous space with little adsorption. This is also contrasted to size exclusion chromatography where the pore size of the medium is typically irregular and results in a gradual change of the molar mass in the eluent over time, rather than sharp cutoff. The present inventors demonstrate that h-polyHIPE provides superior, time-saving and inexpensive solution to separation of substrates rigorously by size, exceeding the separation efficiency of commercial state-of-the-art separation media frequently used in protein purification.

The size-selective separation was first demonstrated with h-polyHIPE synthesized with PLA-CTA-20 and an aqueous solution containing RITC-Dex-10 and fluorescein isothiocyanate-dextran with $M_w$=500 kg mol$^{-1}$ (FITC-Dex-500, $D_h$=32 nm) (FIG. 4 in parts (C) and (D)). The h-polyHIPE monolith was inserted into a disposable syringe and the solution was eluted through the h-polyHIPE by pressing a plunger for 10 seconds (corresponding to an elution rate of about 18 mL min$^{-1}$). Strikingly, an eluent containing 97% FITC-Dex-500 and a trace (3%) of RITC-Dex-10 was obtained indicating that the h-polyHIPE selectively adsorbed the RITC-Dex-10 (3% eluted) while eluting most of the FITC-Dex-500 (78% eluted). In contrast, the polyHIPE was not able to selectively capture RITC-Dex-10 due to the lack of mesopores, and resulted in a RITC-Dex-10 and FITC-Dex-500 mixture in the eluent (FIG. 4 in parts (E) and (F)).

Even the same h-polyHIPE could exclusively separate a mixture of RITC-Dex-70 and FITC-Dex-150 yielding an eluent containing 98% of FITC-Dex-150, indicating that the molecular weight cutoff (MWCO) of the h-polyHIPE provided by the mesopore (with mode pore diameter of 10.2 nm estimated by BJH analysis) was very sharp to clearly differentiate a macromolecule with $D_h$ of 12 from that with 17 nm. The MWCO could be further tuned by varying the molar mass of PLA that changes the mesopore size of the h-polyHIPE. The h-polyHIPE prepared with PLA-CTA-7 possessing mesopores with a mode pore diameter of 4.5 nm selectively adsorbed RITC-Dex-10 ($D_h$=4.6 nm) and excluded FITC-Dex-70 ($D_h$=12 nm) (FIG. 5 in parts (C) and (D)), resulting in >99% enrichment of FITC-Dex-70 in the eluent even from a mixture of 67% RITC-Dex-10 and 33% FITC-Dex-70 (FIGS. 17 and 18 and Table 8).

INDUSTRIAL APPLICABILITY

The method of preparing a hierarchically porous polymer according to the present invention can both the macropore size and mesopore size, and can prepare a hierarchically porous polymer having a very high porosity (>90%). The porous functional structure of the hierarchically porous polymer as prepared above has effects in that since it can easily separate polymers having different sizes, it is very useful in the polymer separation and catalysis application field, and has high marketability due to facilitation of mass production, unlike conventional products.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. A method of preparing a hierarchically porous polymer, comprising:
   (a) preparing a high internal phase emulsion (HIPE) by mixing an aqueous solution and an organic polymerization mixture comprising a macro-chain transfer agent consisting of a sacrificial polymer and chain transfer agent end functional group, a monomer, a cross-linking agent, and a surfactant, and polymerizing it into a block copolymer, consisting of the sacrificial polymer and poly(monomer-cross-linking agent) formed from the monomer and the cross-linking agent, in an external phase of the high internal phase emulsion (HIPE) through polymerization-induced microphase separation and conversion of the external phase of the high internal phase emulsion (HIPE) to cross-linked block copolymer in which aqueous droplets are present, wherein the chain transfer agent moiety bound to end of the sacrificial polymer mediates growth of a polymer block from the end of the sacrificial polymer via reversible addition-fragmentation chain transfer (RAFT) mechanism to cause the microphase separation of the emerging cross-linked block copolymer;
   (b) obtaining a macroporous polymer in which macropores are connected by removing the aqueous droplets; and
   (c) obtaining a hierarchically porous polymer having three-dimensionally continuous mesopores formed in macropore walls thereof (h-polyHIPE) by treating the obtained macroporous polymer with a base to remove the sacrificial polymer, wherein macropores are connected to each other, and the macropores and mesopores together provide a porosity that is at least 90% by volume of the h-polyHIPE, the macropores have a size of 50 nm to 10 μm, and the mesopores have a size of 2-50 nm,
   wherein the h-polyHIPE is a monolithic solid,
   wherein volume of the macropores is adjusted depending on (i) a ratio between the organic polymerization mixture and the aqueous solution, and (ii) composition of the aqueous solution, wherein volume and size of the mesopores are adjusted depending on an amount and molecular weight of the polymer, wherein said ratio between the organic polymerization mixture and the aqueous solution comprises a volume ratio between the organic polymerization mixture and the aqueous solution of 1:2.85 to 9, and wherein the sacrificial polymer for forming mesopores is in an amount of 10 to 30 parts by weight, based on 100 parts by weight of the organic polymerization mixture.

2. The method of preparing a hierarchically porous polymer of claim 1, wherein the volume of the macropores is adjusted depending on mixing conditions, or an amount of the surfactant.

3. The method of preparing a hierarchically porous polymer of claim 1, wherein the aqueous solution comprises at least one compound selected from the group consisting of calcium chloride ($CaCl_2$), potassium persulfate ($K_2S_2O_8$), sodium chloride (NaCl), potassium sulfate ($K_2SO_4$), phosphate buffered saline (PBS), and ascorbic acid.

4. The method of preparing a hierarchically porous polymer of claim 1, wherein the macro-chain transfer agent is at least one selected from the group consisting of PLA-CTA (polylactide-chain transfer agent), PLA-b-PPEGA-CTA (polylactide-b-poly(ethylene glycol) acrylate-chain transfer agent), PI-CTA (poly(isoprene)-chain transfer agent), and PDMS-CTA (poly(dimethylsiloxane)-chain transfer agent).

5. The method of preparing a hierarchically porous polymer of claim 1, wherein the high internal phase emulsion is mixed at a stirring rate of 300-3000 rpm at room temperature.

6. The method of preparing a hierarchically porous polymer of claim 1, wherein the surfactant is contained in an amount of 8 to 17 parts by weight based on 100 parts by weight of the organic polymerization mixture.

7. The method of preparing a hierarchically porous polymer of claim 1, wherein the polymer is selected from the group consisting of polylactide (PLA), polyethylene oxide (PEO), polydimethylsiloxane (PDMS), and polyisoprene (PI).

8. The method of preparing a hierarchically porous polymer of claim 1, wherein the monomer is at least one selected from the group consisting of styrene, 2-ethylhexyl acrylate, 2-ethylhexyl methacrylate, butyl acrylate, isobornyl acrylate, 4-tert-butylstyrene, 4-methylstyrene, 4-isopropylstyrene, 4-cyclohexylstyrene, 4-trimethylsilylstyrene, vinylbenzyl chloride, and p-ethyl styrene.

9. The method of preparing a hierarchically porous polymer of claim 1, wherein the cross-linking agent is at least one selected from the group consisting of divinylbenzene, 2,4,6,8-tetramethyl-2,4,6,8-tetravinylcyclotetrasiloxane, 1,3,5-trimethyl-1,3,5-trivinyl-cyclotrisiloxane, diethylene glycol divinyl ether, diethylene glycol diacrylate, ethylene glycol dimethacrylate, 1,3-diethenyl-1,1,3,3-tetramethyldisiloxane, and methylene bisacrylamide.

10. A hierarchically porous polymer prepared by the method of claim 1, wherein three-dimensionally continuous mesopores are formed in macropore walls in which macropores are connected to each other, and the macropores and mesopores together provide a porosity that is at least 90% by volume of the hierarchically porous polymer, wherein the macropores have a size of 50 nm to 10 μm, and the mesopores have a size of 2-50 nm.

11. A method of separating a polymer, comprising using the hierarchically porous polymer of claim 10.

* * * * *

UNITED STATES PATENT AND TRADEMARK OFFICE
CERTIFICATE OF CORRECTION

PATENT NO. : 11,180,626 B2  
APPLICATION NO. : 16/190352  
DATED : November 23, 2021  
INVENTOR(S) : Seo et al.

Page 1 of 1

It is certified that error appears in the above-identified patent and that said Letters Patent is hereby corrected as shown below:

In the Specification

Column 4, Line 37, "$C_{\text{Span 80}}$ so according" should be -- $C_{\text{Span 80}}$ according --.

Column 6, Line 46, "PT-CTA" should be -- PI-CTA --.

Column 6, Lines 53-54, "4-methyl styrene, 4-isopropyl styrene, 4-cyclohexyl styrene, 4-trim ethyl silyl styrene" should be -- 4-methylstyrene, 4-isopropylstyrene, 4-cyclohexylstyrene, 4-trimethylsilylstyrene --.

Column 6, Line 60, "diethyl ene glycol divinyl ether" should be -- diethylene glycol divinyl ether --.

Column 16, Line 46, "micropores" should be -- macropores --.

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*